United States Patent
Honda et al.

(10) Patent No.: US 7,616,153 B2
(45) Date of Patent: Nov. 10, 2009

(54) ELECTRONIC DEVICE AND TIME ADJUSTMENT METHOD

(75) Inventors: Katsuyuki Honda, Nagano-ken (JP); Osamu Urano, Nagano-ken (JP); Teruhiko Fujisawa, Nagano-ken (JP); Jun Matsuzaki, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 125 days.

(21) Appl. No.: 11/830,629

(22) Filed: Jul. 30, 2007

(65) Prior Publication Data

US 2008/0030403 A1 Feb. 7, 2008

(30) Foreign Application Priority Data

Aug. 4, 2006 (JP) ............................. 2006-213480
Aug. 4, 2006 (JP) ............................. 2006-213481

(51) Int. Cl.
*G01S 1/02* (2006.01)
(52) U.S. Cl. ............................. 342/357.15; 342/357.13
(58) Field of Classification Search ............ 342/357.01, 342/357.06, 357.13, 357.15; 701/213, 215
See application file for complete search history.

(56) References Cited

U.S. PATENT DOCUMENTS

| | | | |
|---|---|---|---|
| 4,949,268 A | 8/1990 | Nishikawa et al. | |
| 5,214,757 A | 5/1993 | Mauney et al. | |
| 5,402,347 A | 3/1995 | McBurney et al. | |
| 5,408,444 A | 4/1995 | Kita et al. | |
| 5,790,477 A | 8/1998 | Hauke | |
| 6,278,660 B1 | 8/2001 | Tognazzini | |
| 6,292,743 B1 | 9/2001 | Pu et al. | |
| 6,313,786 B1 * | 11/2001 | Sheynblat et al. | 342/357.02 |
| 6,784,834 B2 * | 8/2004 | Sirola et al. | 342/357.15 |
| 6,873,573 B2 | 3/2005 | Pikula et al. | |
| 6,959,192 B1 | 10/2005 | Cannon et al. | |
| 7,388,812 B2 | 6/2008 | Nakamura | |
| 7,414,921 B2 | 8/2008 | Gauthey et al. | |
| 2001/0056325 A1 | 12/2001 | Pu et al. | |
| 2002/0142783 A1 | 10/2002 | Yoldi et al. | |
| 2003/0004639 A1 | 1/2003 | Punkka et al. | |
| 2006/0058926 A1 | 3/2006 | Abbott et al. | |
| 2006/0274605 A1 | 12/2006 | Gauthey et al. | |

FOREIGN PATENT DOCUMENTS

| | | |
|---|---|---|
| CN | 1705918 | 12/2005 |
| DE | 19821320 A1 | 12/1998 |

(Continued)

OTHER PUBLICATIONS

"Garmin GPS 12 Owner's Manual & Reference," Jan. 1999.

*Primary Examiner*—Dao L Phan

(57) ABSTRACT

An electronic device having a reception unit that receives satellite signals from positioning information satellites orbiting the Earth; a time information generating unit that generates time information; a time correction information storage unit that stores time correction information for correcting the time information; a time correction information generating unit that generates the time correction information based on the satellite signals; an environmental information acquisition unit that gets information about the reception unit environment; a reception environment information generating unit that generates reception environment information for the reception unit based on the environment information; and a positioning information satellite selection unit that selects the positioning information satellite from which signals are to be received by the reception unit based on the reception environment information.

9 Claims, 23 Drawing Sheets

FOREIGN PATENT DOCUMENTS

| | | |
|---|---|---|
| EP | 1203966 A2 | 5/2002 |
| JP | 815463 | 1/1996 |
| JP | 11237462 | 8/1999 |
| JP | 2001059864 | 3/2001 |
| WO | 9527927 A1 | 10/1995 |
| WO | 9840795 A1 | 9/1998 |

* cited by examiner

ELECTRONIC DEVICE AND TIME ADJUSTMENT METHOD

CROSS-REFERENCE TO RELATED APPLICATIONS

Japanese Patent application No. (s) 2006-213480 and 2006-213481 are hereby incorporated by reference in their entirety.

BACKGROUND

1. Field of Invention

The present invention relates to an electronic device that sets the time based on signals received from a GPS satellite, for example, and to a time correction method for the electronic device.

2. Description of the Related Art

The Global Positioning System (GPS), which is a system enabling a receiving device to determine its own position, uses satellites (GPS satellites) that each orbit the Earth on a specific path. Each GPS satellite has an on-board atomic clock and keeps time with extremely high precision.

Japanese Unexamined Patent Appl. Pub. 08-15463 (see the abstract), for example, teaches a method of using data from the atomic clock of a GPS satellite to correct the time kept by a timepiece with high precision.

However, in order to get atomic clock data from a GPS satellite, the GPS receiver must first capture a signal from a GPS satellite orbiting the Earth and synchronize with the GPS satellite signal.

When the receiver that receives the signals from the GPS satellites is embedded in an electronic device such as a wristwatch, however, the receiver moves with user of the electronic device (wristwatch) wherever the user travels around the Earth.

Depending on the location of the user, tall buildings and other structures can interfere with signal reception from the orbiting GPS satellites, and it may therefore take a long time to adjust the time kept by the timepiece.

When the user is indoors in a building, it can be particularly difficult for the receiver to receive signals from the GPS satellites.

In order for the receiver to locate a GPS satellite and receive a signal under such conditions it may be necessary to drive the receiver for a long time. This obviously increases power consumption by the electronic device.

Timepieces and many other electronic devices, however, require very little power. Incorporating a high power consumption GPS receiver such as described while also satisfying the low power supply requirement of small electronic devices such as timepieces is therefore difficult, and adjusting the time kept by a timepiece in an electronic device with high precision is therefore not possible.

SUMMARY OF THE INVENTION

The present invention provides an electronic device that enables adjusting the time with high precision without high power consumption, and provides a time correction method for the electronic device.

A first aspect of the invention is an electronic device having a reception unit that receives satellite signals from positioning information satellites orbiting the Earth; a time information generating unit that generates time information; a time correction information storage unit that stores time correction information for correcting the time information; a time correction information generating unit that generates the time correction information based on the satellite signals; an environmental information acquisition unit that gets information about the reception unit environment; a reception environment information generating unit that generates reception environment information for the reception unit based on the environment information; and a positioning information satellite selection unit that selects the positioning information satellite from which signals are to be received by the reception unit based on the reception environment information.

This aspect of the invention has a positioning information satellite selection unit that selects the positioning information satellite from which signals are to be received by the reception unit based on the reception environment information. The positioning information satellite selection unit thus selects a suitable positioning information satellite from which signals can be easily received in the reception environment information of the reception unit. The power consumed to drive the reception unit can thus be reduced. The time output by the time information generating unit can also be corrected with high precision because satellite signals from the positioning information satellite can be received. The electronic device can also be easily reduced in size because power consumption is low.

Preferably, the electronic device also has an almanac data storage unit that stores almanac data describing orbital information for all of a plurality of positioning information satellites orbiting the Earth; and the positioning information satellite selection unit selects the positioning information satellite from which signals are to be received by the reception unit based on the reception environment information and the almanac data.

In this aspect of the invention the positioning information satellite selection unit is arranged to select the positioning information satellite from which signals are to be received by the reception unit based on the reception environment information and the almanac data. More specifically, a suitable positioning information satellite can be selected because the positioning information satellite is selected based on information about the orbits traveled by the positioning information satellites around the Earth, for example.

Further preferably, the environmental information is indoor location information indicating the reception unit is located indoors, or outdoor location information indicating the reception unit is located outdoors; the positioning information satellite selection unit selects a positioning information satellite at a low altitude (located at a low angle of elevation and closer to the horizon than the zenith, referred to below as "low altitude") from the almanac data when the environmental information is indoor location information, and selects a positioning information satellite at a high altitude (located at a high angle of elevation and closer to the zenith than the horizon, referred to below as "high altitude") from the almanac data when the environmental information is outdoor location information.

In this aspect of the invention the positioning information satellite selection unit selects a positioning information satellite at a low altitude from the almanac data when the environmental information is indoor location information, and selects a positioning information satellite at a high altitude from the almanac data when the environmental information is outdoor location information.

More specifically, if the electronic device is indoors, satellite signals from positioning information satellites at a high altitude may be blocked by the roof, for example, and therefore difficult to receive, but signals from positioning information satellites at a low altitude can be received through windows, for example. This aspect of the invention therefore selects a positioning information satellite at a low altitude when the electronic device is determined to be indoors, and can therefore quickly receive the satellite signal.

However, when the electronic device is outdoors there is no roof overhead and signals can be received from positioning information satellites at a high altitude. Furthermore, when the positioning information satellite is as close as possible to the zenith (at a high altitude directly overhead), the satellite signal will not be blocked by buildings and other obstacles near the electronic device, and the satellite signal can therefore be received.

When the electronic device is determined to be outdoors, this aspect of the invention therefore selects a positioning information satellite at a high altitude and can therefore quickly receive the satellite signal.

By thus determining if the electronic device is indoors or outdoors, satellite signals from the positioning information satellite can be quickly received, power consumption can be reduced, and the time can be adjusted with high precision.

In an electronic device according to another preferred aspect of the invention, the reception unit has an azimuth-of-reception information storage unit that stores azimuth-of-reception information, which is azimuth information for the positioning information satellite from which the reception unit previously received a signal; and the positioning information satellite selection unit preferentially selects the positioning information satellite that matches the azimuth-of-reception information when selecting a positioning information satellite at a low altitude from the almanac data.

In this aspect of the invention the reception unit has an azimuth-of-reception information storage unit that stores azimuth-of-reception information, which is azimuth information for the positioning information satellite from which the reception unit previously received a signal; and the positioning information satellite selection unit preferentially selects the positioning information satellite that matches the azimuth-of-reception information when selecting a positioning information satellite at a low altitude from the almanac data.

The positioning information satellite selection unit can therefore select a positioning information satellite at the same general azimuth denoted by the azimuth information for the previous reception operation, and the reception unit can more quickly and reliably receive satellite signals from the positioning information satellite.

Further preferably, the electronic device also has a specific azimuth information storage unit that stores specific azimuth information, which is azimuth information for the positioning information satellite. The positioning information satellite selection unit preferentially selects the positioning information satellite that matches the specific azimuth information when selecting a positioning information satellite at a low altitude from the almanac data.

This aspect of the invention has a specific azimuth information storage unit that stores specific azimuth information, which is azimuth information for the positioning information satellite, and the positioning information satellite selection unit preferentially selects the positioning information satellite that matches the specific azimuth information when selecting a positioning information satellite at a low altitude from the almanac data.

More specifically, by entering and storing azimuth information at which positioning information satellite signals can be easily received as the specific azimuth information, the selection accuracy of the positioning information satellite selection unit is improved and the reception unit can more quickly and reliably receive the positioning information satellite signals.

In another preferred aspect of the invention the almanac data includes satellite time and movement information that is time-based movement information for the positioning information satellites; and the positioning information satellite selection unit adds standby time information based on the satellite time and movement information to select a positioning information satellite.

In this aspect of the invention the almanac data includes satellite time and movement information that is time-based movement information for the positioning information satellites; and the positioning information satellite selection unit adds standby time information based on the satellite time and movement information to select a positioning information satellite.

This aspect of the invention thus receives satellite signals from the positioning information satellite at a time when the satellite signal can be received at the location of the electronic device. The reception unit is therefore not forced to needlessly attempt to receive the satellite signals when there is no satellite above, and power consumption can thus be reduced while reliably receiving satellite signals from the positioning information satellites.

Further preferably, the electronic device also has a satellite altitude-related transmission delay time information storage unit that stores satellite altitude-related transmission delay time information, which is transmission delay time information correlated to positioning information satellite altitude information where the transmission delay time is the time required for the satellite signal transmitted from the positioning information satellite to reach the reception unit. The reception unit acquires satellite time information from the positioning information satellite; and the time correction information generating unit produces the time correction information based on the satellite time information and the satellite altitude-related transmission delay time information.

This aspect of the invention thus has a satellite altitude-related transmission delay time information storage unit that stores satellite altitude-related transmission delay time information, which is transmission delay time information correlated to positioning information satellite altitude information where the transmission delay time is the time required for the satellite signal transmitted from the positioning information satellite to reach the reception unit.

This enables the electronic device to determine the transmission delay time from the positioning information satellite to the reception unit with precision adjusted for the altitude of the positioning information satellite.

Furthermore, the reception unit acquires satellite time information from the positioning information satellite; and the time correction information generating unit produces the time correction information based on the satellite time information and the satellite altitude-related transmission delay time information.

More specifically, the reception unit acquires the highly precise satellite time information, such as the GPS time, and produces high precision time correction information by adding the high precision satellite altitude-related transmission delay time information to this precise time information.

By adjusting the time based on this high precision time correction information, the time can be corrected with high precision.

Furthermore, because this aspect of the invention does not need to get the precise position of the positioning information satellite on its orbit, the reception unit can receive a smaller part of the satellite signal to get the information of interest, the reception time can therefore be shortened, and power consumption can be further reduced.

Another aspect of the invention is an electronic device having a reception unit that captures a positioning information satellite orbiting the Earth and receives a signal from the positioning information satellite; and a corrected time information display unit that generates time correction information based on the satellite signal received by the reception unit, corrects the displayed time information based on the time correction information, and displays the corrected time. The reception unit includes an indoor/outdoor determination unit that determines if the electronic device is indoors or outdoors, and captures the positioning information satellite based on the indoor/outdoor determination unit.

In this aspect of the invention the reception unit that captures a positioning information satellite orbiting the Earth and receives a signal from the positioning information satellite has an indoor/outdoor determination unit that determines if the electronic device is indoors or outdoors, and captures the positioning information satellite based on the indoor/outdoor determination unit.

More specifically, in this aspect of the invention the indoor/outdoor determination unit evaluates the reception environment information of the electronic device, and the reception unit captures a positioning information satellite based on the result of evaluating the environment of the electronic device.

In the electronic device according to another preferred aspect of the invention the indoor/outdoor determination unit has a solar panel; a power generation detection data storage unit that detects power generation by the solar panel, and acquires and stores power generation detection data; and a power generation threshold value data storage unit that stores power generation threshold value data related to a power generation threshold value used by the reception unit for the indoor/outdoor determination; and the indoor/outdoor determination unit determines the environment of the electronic device based on the power generation detection data in the power generation detection data storage unit and the power generation threshold value data in the power generation threshold value data storage unit of the indoor/outdoor determination unit.

In this aspect of the invention the indoor/outdoor determination unit has a solar panel; a power generation detection data storage unit that detects power generation by the solar panel, and acquires and stores power generation detection data; and a power generation threshold value data storage unit that stores power generation threshold value data related to a power generation threshold value used by the reception unit for the indoor/outdoor determination; and determines the environment of the electronic device based on the power generation detection data in the power generation detection data storage unit and the power generation threshold value data in the power generation threshold value data storage unit of the indoor/outdoor determination unit.

This indoor/outdoor determination unit detects power generation by the solar panel of the electronic device, compares the detected power output with the power generation threshold value data in the power generation threshold value data storage unit that stores the power generation threshold value used to determine if the electronic device is indoors or outdoors, and determines if the electronic device is indoors or outdoors based on whether the detected power output is greater than or equal to the threshold value or less. Based on the result of this determination, whether the reception unit executes the reception operation for capturing a positioning information satellite is then determined.

If the generated power is less than the threshold value, the indoor/outdoor determination unit determines the electronic device is indoors, and the reception unit therefore does not run the reception operation. Conversely, if the generated power output is greater than or equal to the threshold value, the indoor/outdoor determination unit determines the electronic device is outdoors, and the reception unit therefore runs the reception operation.

The reception unit is therefore prevented from running the reception operation and wasting power when in an environment where reception is not possible. The battery can also be recharged by the power output by the solar panel, and the power consumed by the reception operation can be restored.

In an electronic device according to another aspect of the invention the indoor/outdoor determination unit has an acceleration sensor; an acceleration sensor detection data storage unit that detects the output waveform of the acceleration sensor and stores the resulting acceleration sensor output waveform data; a generated waveform amplitude data storage unit that generates and stores amplitude data from the acceleration sensor output waveform data; and an acceleration threshold value data storage unit that stores acceleration sensor output signal amplitude threshold value data related to a threshold value of the amplitude data used by the reception unit for the indoor/outdoor determination. The indoor/outdoor determination unit determines the environment of the electronic device based on the amplitude data from the acceleration sensor of the indoor/outdoor determination unit, and the acceleration sensor output signal amplitude threshold value data in the acceleration threshold value data storage unit.

In this aspect of the invention the indoor/outdoor determination unit has an acceleration sensor; an acceleration sensor detection data storage unit that detects the output waveform of the acceleration sensor and stores the resulting output waveform data; a generated waveform amplitude data storage unit that generates and stores amplitude data from the output waveform data; and an acceleration threshold value data storage unit that stores acceleration sensor output signal amplitude threshold value data related to a threshold value of the amplitude data used by the reception unit for the indoor/outdoor determination. The indoor/outdoor determination unit determines the environment of the electronic device based on the amplitude data, and the acceleration sensor output signal amplitude threshold value data in the acceleration threshold value data storage unit.

This aspect of the invention detects the output signal from the acceleration sensor of the electronic device, generates amplitude data for the waveform of the detected output signal, compares this amplitude data with the amplitude threshold value used to determine if the electronic device is indoors or outdoors, and determines if the electronic device is indoors or outdoors based on whether the amplitude data is greater than or equal to the threshold value or is less. Based on the result of this determination, whether the reception unit executes the reception operation for capturing a positioning information satellite is then determined.

If the detected amplitude is less than the threshold value, the indoor/outdoor determination unit determines the electronic device is indoors, and the reception unit therefore does not run the reception operation. Conversely, if the detected amplitude is greater than or equal to the threshold value, the indoor/outdoor determination unit determines the electronic device is outdoors, and the reception unit therefore runs the reception operation.

The reception unit is therefore prevented from running the reception operation and wasting power when in an environment where reception is not possible. The indoor/outdoor determination can also be made whether during the day or night because the decision is based on the amplitude of the output signal from the acceleration sensor.

In addition to the arrangement of the foregoing indoor/outdoor determination unit, the indoor/outdoor determination unit in the electronic device according to another aspect of the invention has a solar panel; a power generation detection data storage unit that detects power generation by the solar panel, and acquires and stores power generation detection data; and a power generation threshold value data storage unit that stores power generation threshold value data related to a power generation threshold value used by the reception unit for the indoor/outdoor determination. The indoor/outdoor determination unit determines the environment of the electronic device based on the power generation detection data in the power generation detection data storage unit and the power generation threshold value data in the power generation threshold value data storage unit.

In addition to the acceleration sensor described above, the indoor/outdoor determination unit in this aspect of the invention also has a solar panel; a power generation detection data storage unit that detects power generation by the solar panel, and acquires and stores power generation detection data; and a power generation threshold value data storage unit that stores power generation threshold value data related to a power generation threshold value used by the reception unit for the indoor/outdoor determination. The indoor/outdoor determination unit determines the environment of the electronic device based on the power generation data in the power generation detection data storage unit of the indoor/outdoor determination unit and the power generation threshold value data in the power generation threshold value data storage unit.

In addition to information from the acceleration sensor, this aspect of the invention detects the power generated by the solar panel of the electronic device, compares the detected power output with the power generation threshold value data in the power generation threshold value data storage unit that stores the power generation threshold value used to determine if the electronic device is indoors or outdoors, and determines if the electronic device is indoors or outdoors based on whether the detected power output is greater than or equal to the threshold value or less. Based on the result of this determination, whether the reception unit executes the reception operation for capturing a positioning information satellite is then determined.

If the generated power is less than the threshold value, the indoor/outdoor determination unit determines the electronic device is indoors, and the reception unit therefore does not run the reception operation. Conversely, if the generated power output is greater than or equal to the threshold value, the indoor/outdoor determination unit determines the electronic device is outdoors, and the reception unit therefore runs the reception operation.

By thus using both an acceleration sensor and solar panel, the indoor/outdoor determination unit of this aspect of the invention can be used in all environments.

In another aspect of the invention the indoor/outdoor determination unit has a date data storage unit that stores date data for a date display unit of the electronic device; a time data storage unit that stores time data for a time display unit of the electronic device; a region-of-use data storage unit for inputting region-of-use information for the location of the reception unit; and a daylight data table storage unit that stores data tables including a region data table, a date data table, and a daylight time data table. The electronic device also has a daylight time extraction data storage unit that extracts and stores daylight time data from the daylight time data table based on the date data and region-of-use information, and the region data table and date data table in the daylight data table storage unit; and a power generation/acceleration selection unit that compares the daylight time data with the time data in the time data storage unit.

In this aspect of the invention the indoor/outdoor determination unit has a date data storage unit that stores date data for a date display unit of the electronic device; a time data storage unit that stores time data for a time display unit of the electronic device; a region-of-use data storage unit for inputting region-of-use information for the location of the reception unit; and a daylight data table storage unit that stores data tables including a region data table, a date data table, and a daylight time data table. The electronic device also has a daylight time extraction data storage unit that extracts and stores daylight time data from the daylight time data table based on the date data and region-of-use information, and the region data table and date data table in the daylight data table storage unit; and a power generation/acceleration selection unit that compares the daylight time data with the time data in the time data storage unit.

The indoor/outdoor determination unit in this aspect of the invention has both a solar panel and acceleration sensor. To switch between these means, the date data for a date display unit of the electronic device and the region-of-use information denoting the location of the reception unit are compared with the region data table and date data table in the electronic device. The daylight time data is then extracted from the daylight time data table corresponding to the region data table and date data table for the date data and region-of-use information. The daylight time data and the time display of the electronic device are then compared to select the solar panel if it is currently daytime, and to use the acceleration sensor if it is not daytime. The determination means is thus effectively selected so that the reception unit does not run the reception operation when in an environment where reception is not possible.

The indoor/outdoor determination unit can thus be switched and selected appropriately according to the environment of the electronic device.

Further preferably, the region-of-use information is the position of the reception unit determined from the satellite signal received from the positioning information satellite.

In this aspect of the invention the region-of-use information is the position of the reception unit determined from the satellite signal received from the positioning information satellite.

Because the region-of-use information can be determined by capturing the signal received from the positioning information satellite, the user does not need to input the region information. Furthermore, because the daylight time data can also be extracted from the region information and the date information of the electronic device, and the indoor/outdoor determination unit can be switched based on this daylight time data, it is not necessary to manually input and set the region-of-use information.

In an electronic device according to another preferred aspect of the invention the indoor/outdoor determination unit has an indoor/outdoor determination information storage unit that stores a time band when the reception unit captured the positioning information satellite; and the reception unit captures the positioning information satellite based on the time band in the indoor/outdoor determination information storage unit.

In this aspect of the invention the indoor/outdoor determination unit has an indoor/outdoor determination information storage unit that stores a time band when the reception unit captured the positioning information satellite. Data used for the indoor/outdoor determination is stored for a certain time, and the indoor/outdoor determination means can be switched according to the activity pattern of the user.

In an electronic device according to another preferred aspect of the invention the indoor/outdoor determination unit has a temperature sensor; a power generation detection data storage unit that detects power generation from the temperature sensor, and acquires and stores power generation detection data; and a power generation threshold value data storage unit that stores power generation threshold value data related to a power generation threshold value used by the reception unit for the indoor/outdoor determination. The indoor/outdoor determination unit determines the environment of the electronic device based on the power generation detection data in the power generation detection data storage unit and the power generation threshold value data in the power generation threshold value data storage unit of the indoor/outdoor determination unit.

In this aspect of the invention the indoor/outdoor determination unit has a temperature sensor; a power generation detection data storage unit that detects power generation from the temperature sensor, and acquires and stores power generation detection data; and a power generation threshold value data storage unit that stores power generation threshold value data related to a power generation threshold value used by the reception unit for the indoor/outdoor determination. The environment of the electronic device is determined based on the power generation data in the power generation detection data storage unit and the power generation threshold value data in the power generation threshold value data storage unit of the indoor/outdoor determination unit.

The temperature sensor of the electronic device generates power when a temperature difference is produced. The indoor/outdoor determination unit detects this power output, compares the detected power output with the power generation threshold value data in the power generation threshold value data storage unit that stores power generation threshold value data for determining if the electronic device is indoors or outdoors, and determines if the electronic device is indoors or outdoors based on whether the detected output power is greater than or equal to the threshold value or not. Based on the result of this determination, whether the reception unit executes the reception operation for capturing a positioning information satellite is then determined.

If the generated power is less than the threshold value, the indoor/outdoor determination unit determines the electronic device is indoors, and the reception unit therefore does not run the reception operation. Conversely, if the generated power output is greater than or equal to the threshold value, the indoor/outdoor determination unit determines the electronic device is outdoors, and the reception unit therefore runs the reception operation.

The reception unit is therefore prevented from running the reception operation and wasting power when in an environment where reception is not possible. The electrical energy produced by the temperature difference of the temperature sensor can also be stored in the battery, and the power consumed by the reception operation can be restored.

Another aspect of the invention is a time correction method for an electronic device, the time correction method having an environmental information acquisition step in which an environmental information acquisition unit of the electronic device gets information about the reception unit environment; a reception environment information generating step in which a reception environment information generating unit of the electronic device generates reception environment information for the reception unit based on the environment information; a positioning information satellite selection step in which a positioning information satellite selection unit of the electronic device selects the positioning information satellite orbiting the Earth from which signals are to be received by the reception unit based on the reception environment information; a reception step in which the reception unit of the electronic device receives satellite signals from the positioning information satellite selected in the positioning information satellite selection step; and a time correction information generating step in which a time correction information generating unit of the electronic device generates time correction information for correcting the time information of the time information generating unit based on the satellite signals.

Another aspect of the invention is a time correction method for an electronic device, the time correction method having a step of a reception unit that receives satellite signals from positioning information satellites orbiting the Earth capturing the positioning information satellite; a time correction information generating step of a time correction unit generating time correction information based on the satellite signals received by the reception unit; and a displayed time information correcting step of a display information correction unit correcting the displayed time information based on the time correction information. The reception unit has an indoor/outdoor determination unit for determining the environment of the timepiece device in the step of capturing the positioning information satellite. The indoor/outdoor determination unit has a power generation detection process including detecting and storing power generation by a solar panel, and comparing the power generation detection data and power generation threshold value data in a power generation threshold value data storage unit that stores power generation threshold value data related to a power generation threshold value used to determine if the reception unit is indoors or outdoors. The reception unit is an electronic device that captures the positioning information satellite based on the indoor/outdoor determination unit.

Another aspect of the invention is a time correction method for an electronic device, the time correction method having a step of a reception unit that receives satellite signals from positioning information satellites orbiting the Earth capturing the positioning information satellite; a time correction information generating step of a time correction unit generating time correction information based on the satellite signals received by the reception unit; and a displayed time information correcting step of a display information correction unit correcting the displayed time information based on the time correction information. The reception unit has an indoor/outdoor determination unit for determining the environment of the timepiece device in the step of capturing the positioning information satellite. The indoor/outdoor determination unit has an acceleration sensor output waveform detection process including detecting and storing output waveform data from the acceleration sensor, generating and storing amplitude data from the output waveform data, and comparing the amplitude data with acceleration sensor output signal amplitude threshold value data related to a threshold value of the amplitude data used to determine if the reception unit is indoors or outdoors. The reception unit is an electronic device that captures the positioning information satellite based on the indoor/outdoor determination unit.

Another aspect of the invention is a time correction method for a timepiece device, the time correction method having a step of a reception unit that receives satellite signals from positioning information satellites orbiting the Earth capturing the positioning information satellite; a time correction information generating step of a time correction unit generating time correction information based on the satellite signals received by the reception unit; and a displayed time information correcting step of a display information correction unit correcting the displayed time information based on the time correction information. The reception unit has an indoor/outdoor determination unit for determining the environment of the timepiece device in the step of capturing the positioning information satellite. The indoor/outdoor determination unit has a power generation detection process including detecting and storing power generation by a solar panel, and comparing the power generation detection data and power generation threshold value data in a power generation threshold value data storage unit that stores power generation threshold value data related to a power generation threshold value used to determine if the reception unit is indoors or outdoors; and an acceleration sensor output waveform detection process including detecting and storing output waveform data from the acceleration sensor, generating and storing amplitude data from the output waveform data, and comparing the amplitude data with acceleration sensor output signal amplitude threshold value data related to the amplitude data used to determine if the reception unit is indoors or outdoors. The reception unit is an electronic device that captures the positioning information satellite based on the indoor/outdoor determination unit.

The reception unit in this aspect of the invention has an indoor/outdoor determination unit. The indoor/outdoor determination unit determines whether the reception unit is indoors or outdoors using either a solar panel or an acceleration sensor, or both a solar panel and an acceleration sensor. Based on the result of this determination, the reception unit receives signals from a positioning information satellite. The reception unit is thus prevented from executing the reception operation in an environment where reception is not possible, and thus prevents wastefully consuming power.

Using both devices enables the devices to complement the other in an even more desirable arrangement.

Power generated by the solar panel can also charge the battery when the reception unit runs the reception operation.

Other objects and attainments together with a fuller understanding of the invention will become apparent and appreciated by referring to the following description and claims taken in conjunction with the accompanying drawings.

DESCRIPTION OF THE PREFERRED EMBODIMENTS

Preferred embodiments of the present invention are described below with reference to the accompanying figures.

The embodiments of the invention described below are specific preferred examples of the invention and therefore include some technically desirable limitations, but the scope of the invention is not limited to the following embodiments unless the following description states that the invention is specifically limited in some way.

Embodiment 1

Figure 1:
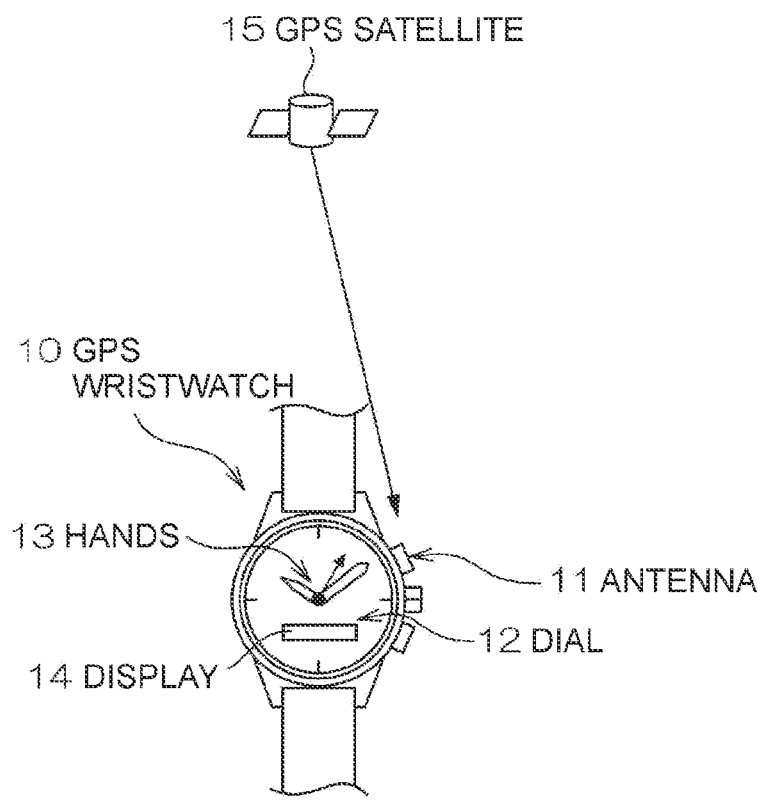
FIG. 1 is a schematic diagram of a wristwatch with a GPS time correction device as a first embodiment of an electronic device according to the present invention.
Figure 2:
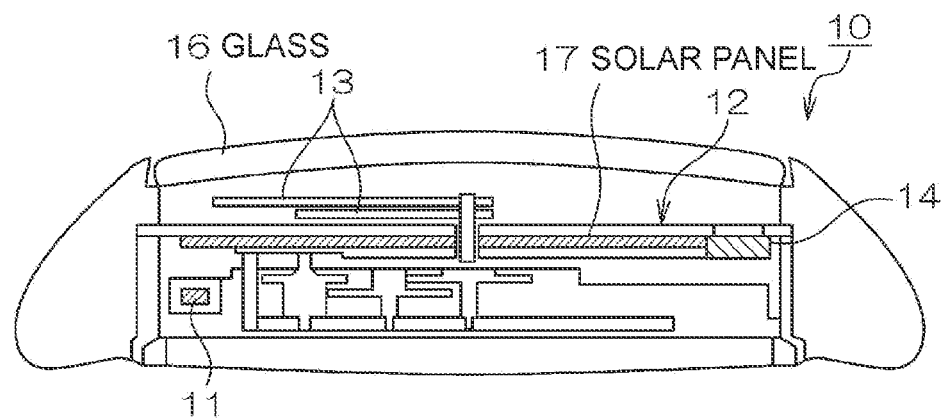
FIG. 2 is a side section view of the GPS wristwatch shown in FIG. 1.
Figure 3:
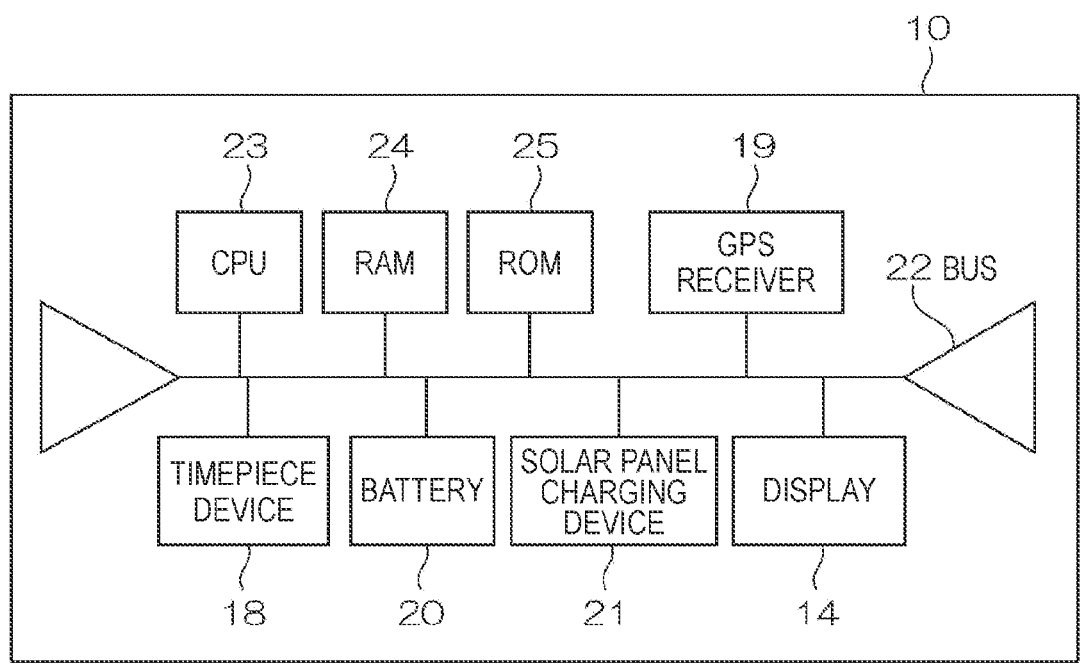
FIG. 3 is a block diagram showing the main internal hardware configuration of the GPS wristwatch shown in FIG. 1.

FIG. 1 is a schematic diagram of a wristwatch with a GPS time correction device 10 (a "GPS wristwatch" below) as a first embodiment of an electronic device according to the present invention. FIG. 2 is a side section view of the GPS wristwatch 10 shown in FIG. 1, and FIG. 3 is a block diagram showing the main hardware configuration of the GPS wristwatch 10 shown in FIG. 1.

As shown in FIG. 1 and FIG. 2 this GPS wristwatch 10 has a dial 12, hands 13 including a long hand and a short hand, and a display 14 composed of the dial and an LED panel for displaying messages rendered on the front. The display 14 is not limited to an LED device and could be an LCD device or an analog display, for example.

As shown in FIG. 2, a glass 16 covers the surface of the dial 12.

As also shown in FIG. 1 and FIG. 2 the GPS wristwatch 10 has an antenna 11, and the antenna 11 is used to receive signals from the GPS satellites 15 travelling on prescribed orbits above the Earth in space.

These GPS satellites 15 are examples of positioning information satellites.

As also shown in FIG. 2, a solar panel 17 is disposed on the back side of the dial 12 in the GPS wristwatch 10, and is part of the solar panel charging device, that is, solar cell, described below.

In addition, as shown in FIG. 3, the GPS wristwatch 10 has a timepiece device 18, a GPS receiver 19, a battery 20, and a solar panel charging device 21 inside and is also arranged to function as a computer.

More specifically, the GPS wristwatch 10 according to this embodiment of the invention is a so-called electronic timepiece.

The components shown in FIG. 3 are further described below.

As shown in FIG. 3 the GPS wristwatch 10 has a bus 22, and a CPU (central processing unit) 23, RAM (random access memory) 24, and ROM (read-only memory) 25 are connected to the bus 22.

A reception unit, or GPS receiver 19, for receiving satellite signals from a GPS satellite 15 is also connected to the bus 22. More specifically, the GPS receiver 19 includes the antenna 11 and has a filter (SAW), RF unit, and baseband unit not shown in the figures.

The GPS receiver 19 thus receives satellite signals from a GPS satellite 15 shown in FIG. 1 through the antenna 11, and extracts the baseband signal through the filter and RF unit. The signals received from the GPS satellite 15 are further described below.

A time information generating unit, such as the timepiece device 18, that generates time information is also connected to the bus 22. More specifically, the timepiece device 18 has a real-time clock (RC) or temperature-compensated crystal oscillator (TCXO) circuit.

A battery 20 used as the power supply, and the solar panel charging device 21, which is a solar cell, for charging the battery 20, are also connected to the bus 22.

Power generated by the solar panel charging device 21 is thus supplied to the battery 20.

The display 14 shown in FIG. 1 is also connected to the bus 22.

The bus 22 is thus an internal bus with addresses, data paths, and functions for connecting all of the other devices. The CPU 23 uses RAM 24 to run specific programs and control the RAM 24 and ROM 25 that are also connected to the bus 22. The ROM 25 stores the programs and certain information.

Figure 4:
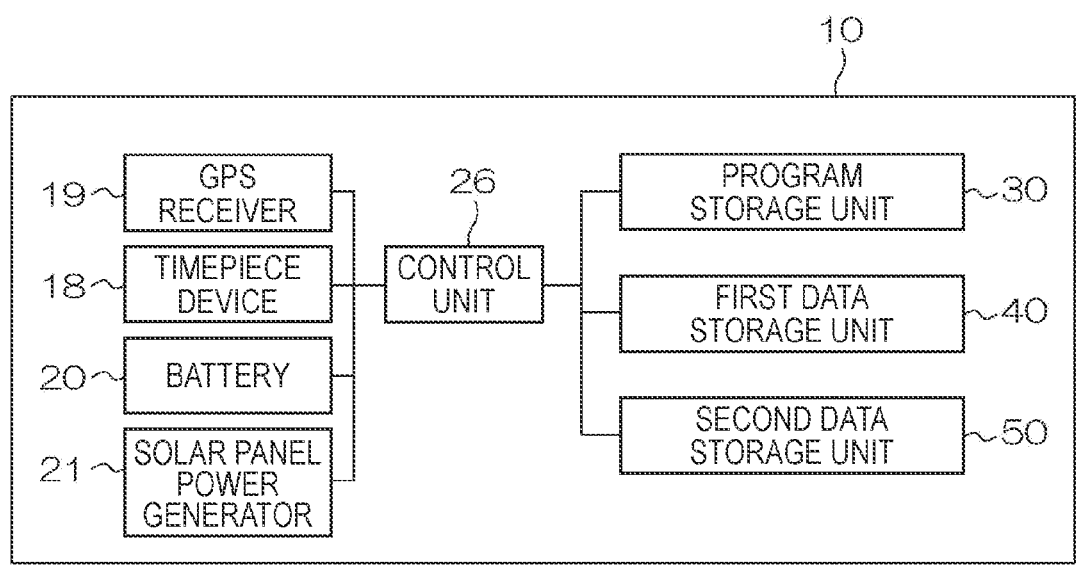
FIG. 4 is a general overview schematically showing the main software arrangement of the GPS wristwatch.

FIG. 4 to FIG. 7 are schematic diagrams showing the main software arrangement of the GPS wristwatch 10, FIG. 4 being a general overview.

As shown in FIG. 4 the GPS wristwatch 10 has a control unit 26. The control unit 26 controls the GPS receiver 19, the timepiece device 18, the battery 20, and the solar panel charging device 21, processes the programs and data stored in the program storage unit 30, the first data storage unit 40, and the second data storage unit 50.

Note that the program storage unit 30, the first data storage unit 40, and the second data storage unit 50 are shown as discrete units in FIG. 4. In practice, however, data is not stored separately as shown in FIG. 4 and is shown separately in FIG. 4 for convenience only.

Primarily data that is initially stored is stored in the first data storage unit 40 shown in FIG. 1. Primarily data that results from processing the data stored in first data storage unit 40 by running the programs stored in the program storage unit 30 is stored in the second data storage unit 50.

Figure 5:
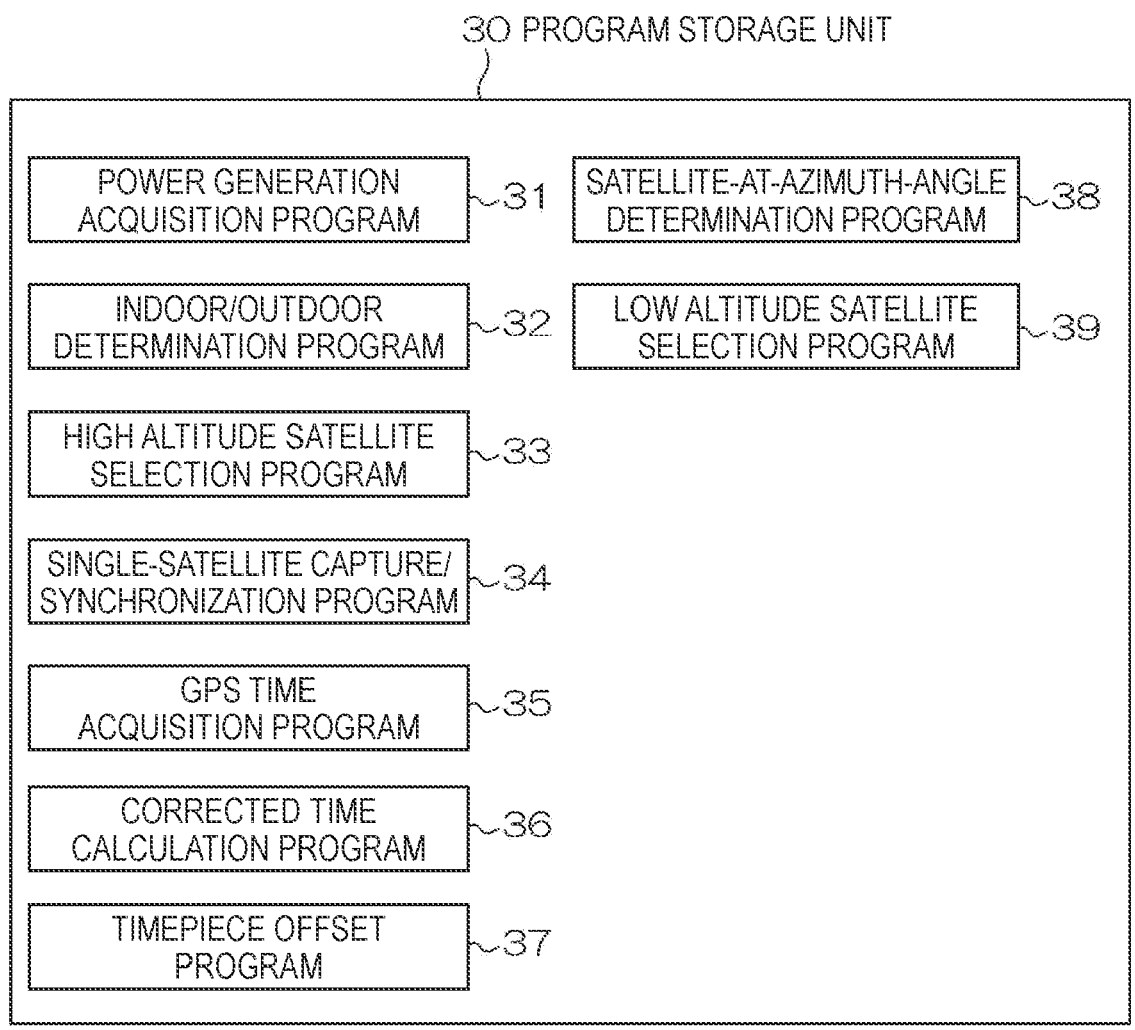
FIG. 5 shows the data stored in the program storage units in FIG. 4.
Figure 6:
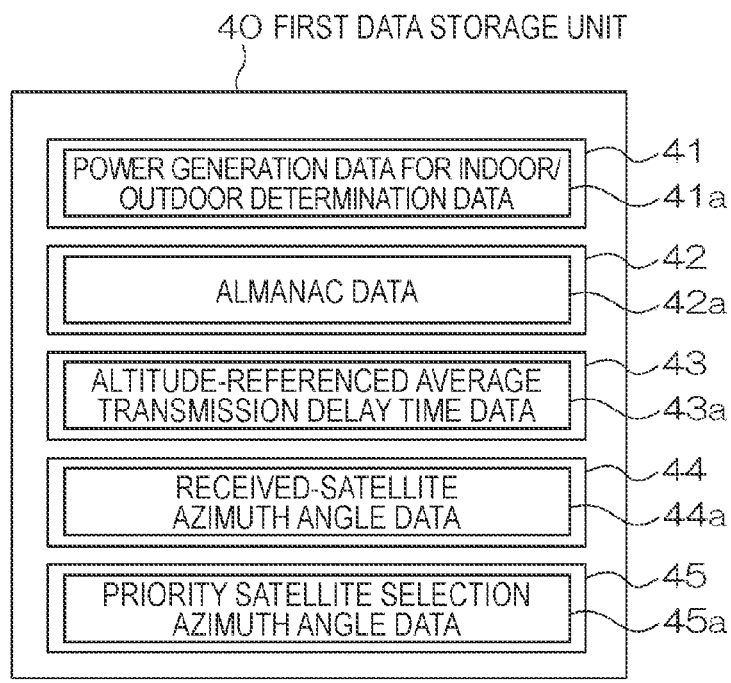
FIG. 6 is a schematic diagram of the data stored in the first data storage unit in FIG. 4.
Figure 7:
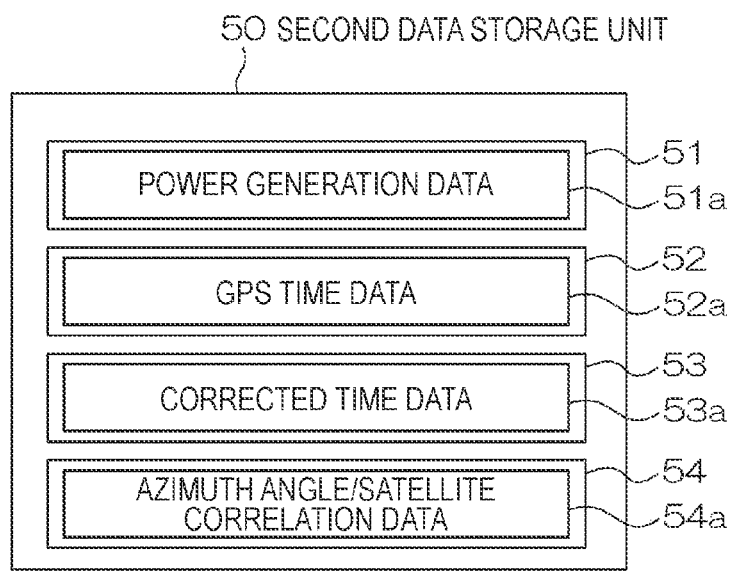
FIG. 7 is a schematic diagram of the data stored in the second data storage unit shown in FIG. 4.

FIG. 5 is a block diagram of the data stored in the program storage unit 30 shown in FIG. 4. FIG. 6 is a schematic diagram of the data stored in the first data storage unit 40 in FIG. 4. FIG. 7 is a schematic diagram of the data stored in the second data storage unit 50 shown in FIG. 4.

FIG. 8 to FIG. 11 are flow charts describing the main operation of the GPS wristwatch 100 according to this embodiment of the invention.

The operation of the GPS wristwatch 10 according to this embodiment of the invention is described below with reference to the flow charts in FIG. 8 to FIG. 11 while also describing the related programs and data shown in FIG. 5 to FIG. 7.

The GPS wristwatch 10 shown in FIG. 1 is arranged to adjust the time kept by the timepiece device 18 at a specific time on a regular schedule, such as every day. The time is corrected by receiving a signal from a GPS satellite 15 as further described below.

Figure 8:
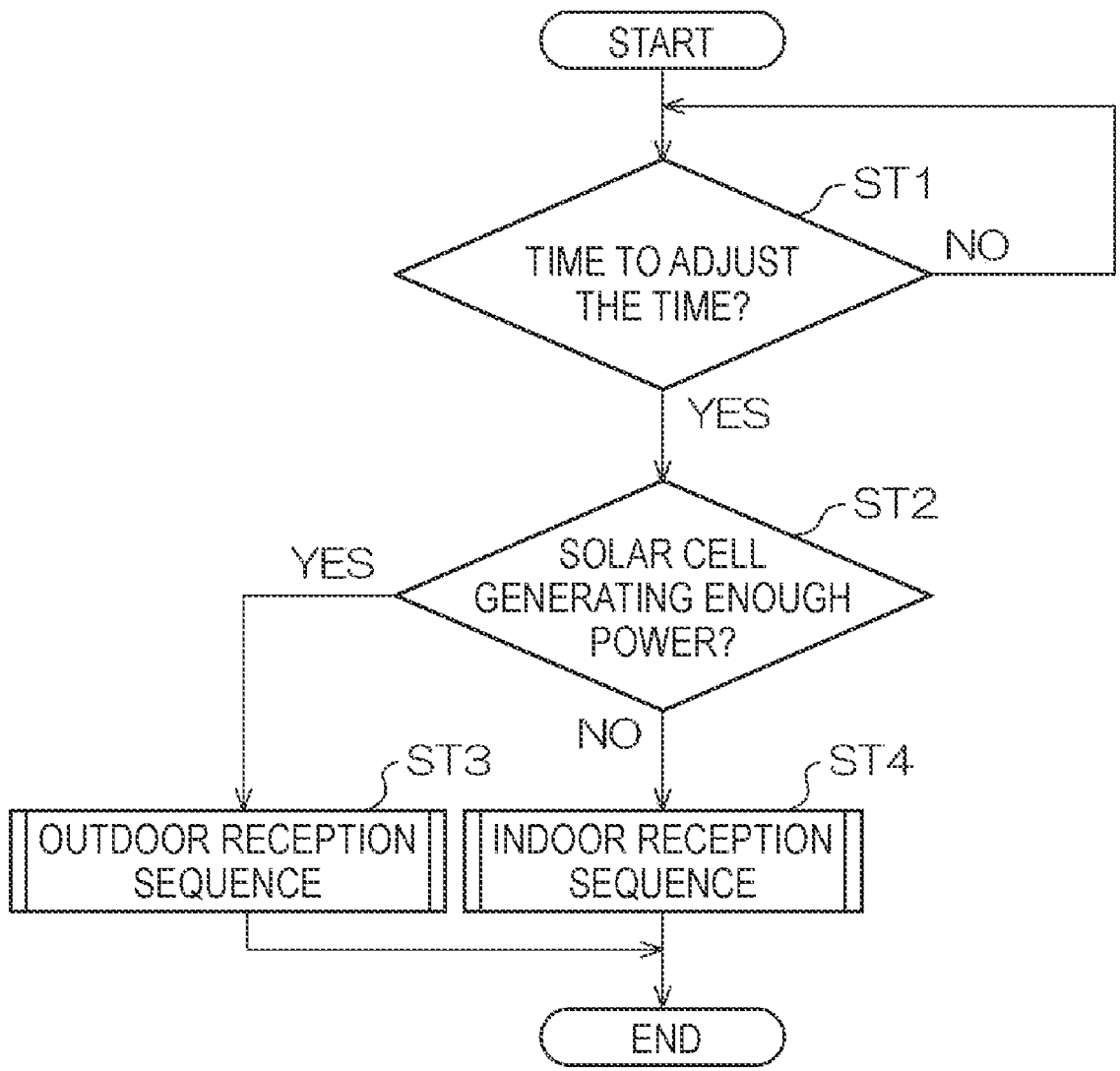
FIG. 8 is a flow chart describing the main operation of the GPS wristwatch according to the first embodiment of the invention.

As shown in FIG. 8, the first step is therefore to determine if the time set for adjusting the time has come (ST1). If the prescribed has come, control goes to step ST2. Whether the solar cell is generating sufficient power is then determined in step ST2. If step ST2 determines that the solar cell is generating at least a prescribed amount of power, the outdoor reception sequence in step ST3 is executed. If the solar cell is not generating the prescribed amount of power. The indoor reception sequence is executed in step ST4.

Because the GPS wristwatch 10 receives signals from a GPS satellite 15 orbiting the Earth in space in order to adjust the time, if the GPS wristwatch 10 is located indoors in a building and attempts to receive signals from a GPS satellite 15 travelling at a high altitude, such as at its zenith (in space directly above the GPS receiver), the signals can be blocked by the roof or walls of the building and reception can be difficult.

However, because buildings also have windows, if a GPS satellite 15 can be found at a low altitude (such as near the horizon where the angle of elevation is small) when the GPS wristwatch 10 is indoors, the GPS signal will not be blocked by the roof of the building and can pass into the building through the window, and the GPS wristwatch 10 can therefore receive the signal more easily.

In the indoor reception sequence executed in step ST4 as further described below, the GPS wristwatch 10 therefore attempts to capture and receive a signal from a GPS satellite 15 at a low altitude. This sequence is described in detail below.

On the other hand, there may be buildings nearby when the GPS wristwatch 10 is outdoors. If the GPS wristwatch 10 attempts to receive signals from a GPS satellite 15 at a low altitude in this case, the buildings may block the signals and reception may be difficult. In this situation the GPS wristwatch 10 preferably receives signals from a GPS satellite 15 at a high altitude, and further preferably from a GPS satellite 15 at the zenith (in space directly above the GPS receiver).

In the outdoor reception sequence executed in step ST3, the GPS wristwatch 10 therefore captures and receives signals from a GPS satellite 15 at a high altitude. This sequence is described in detail below.

The operation of the GPS wristwatch 10 in this embodiment of the invention thus changes according to whether the GPS wristwatch 10 is indoors or outdoors. The GPS wristwatch 10 cannot determine whether it is indoors or outdoors directly, however, and therefore makes this decision based on the power produced by the solar cell of ST2.

More specifically, because power output increases if the GPS wristwatch 10 is outdoors and decreases if the GPS wristwatch 10 is indoors, determining whether the GPS wristwatch 10 is indoors or outdoors is based on power generation by the solar cell.

Figure 12:
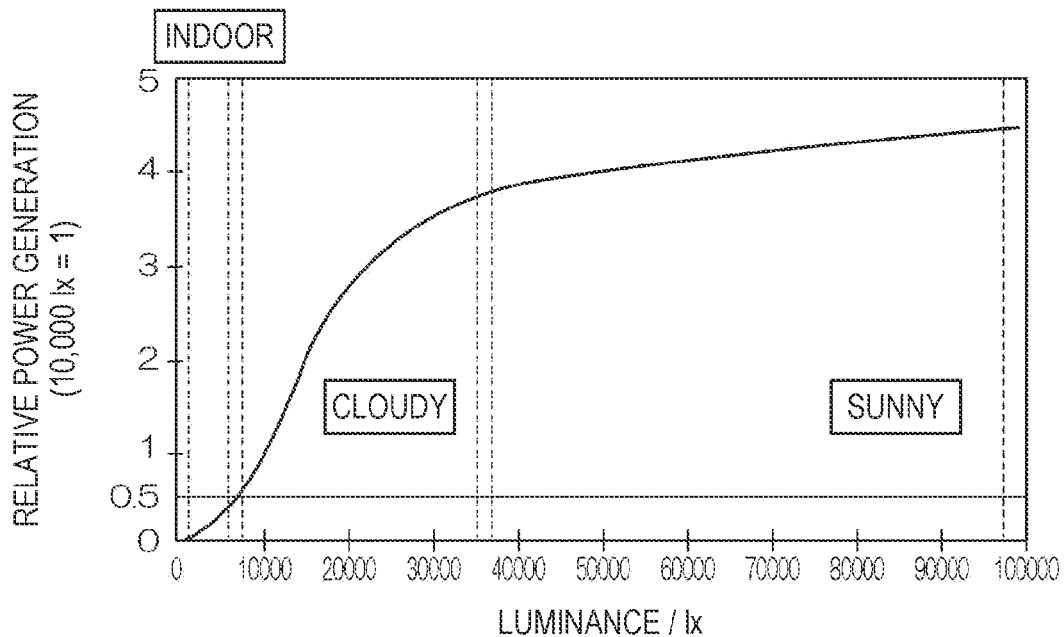
FIG. 12 is a graph describing the relationship luminance and the relative power output of the solar panel charging device (solar cell) shown in FIG. 3.

This indoor/outdoor determination is described in detail below. FIG. 12 is a graph showing the relationship between relative power output of the solar panel charging device 21, which is a solar cell, shown in FIG. 3 and luminance. As shown in the graph, luminance is low indoors (inside a building) and high outdoors.

The relative power output varies with luminance. As shown in FIG. 12, when the relative power output is less than 0.5 (5,000 lx), the probability of being indoors is high, and when the relative power output is greater than or equal to 0.5, the probability of being outdoors is high.

This embodiment of the invention therefore determines that the GPS wristwatch 10 is outdoors when the relative power output is greater than or equal to 0.5 (lx), and is indoors when the relative power output is less than 0.5 (lx).

Data for this evaluation is stored as the power generation data for indoor/outdoor determination data 41a in the power generation data for indoor/outdoor determination data storage unit 41.

In step ST2, the power generation acquisition program 31 of the GPS wristwatch 10 therefore operates, gets the power output data of the solar panel charging device 21, and stores the result as the power generation data 51a in the power generation data storage unit 51 shown in FIG. 7.

The indoor/outdoor determination program 32 in FIG. 5 then executes to compare the power generation data 51a in FIG. 7 and the power generation data for indoor/outdoor determination data 41a in FIG. 6. More specifically, it determines if the power output represented as the power generation data 51a is greater than or equal to the 0.5 (lx) shown in FIG. 12.

If the power generation data 51a is greater than or equal to 0.5 (lx), the GPS wristwatch 10 is determined to be outdoors, and the outdoor reception sequence in step ST3 executes. If the power generation data 51a is less than 0.5 (lx), the GPS wristwatch is determined to be indoors and the indoor reception sequence in step ST4 executes.

The GPS wristwatch 10 according to this embodiment of the invention can thus accurately determine if it is indoors or outdoors.

The power generation acquisition program 31 is thus an example of an environmental information acquisition unit that gets information (power generation data storage unit 51) about the current environment of the reception unit (GPS receiver 19).

The indoor/outdoor determination program 32 is an example of a reception environment information generating unit that generates reception environment information (indoor/outdoor) for the reception unit (GPS receiver 19) based on the environment information (power generation data 51a).

The power generation data 51a is an example of indoor location information indicating the reception unit (GPS receiver 19) is located indoors, and outdoor location information indicating the reception unit (GPS receiver 19) is located outdoors.

Step ST2 is an example of an environment information acquisition step and a reception environment information generating step.

Figure 9:
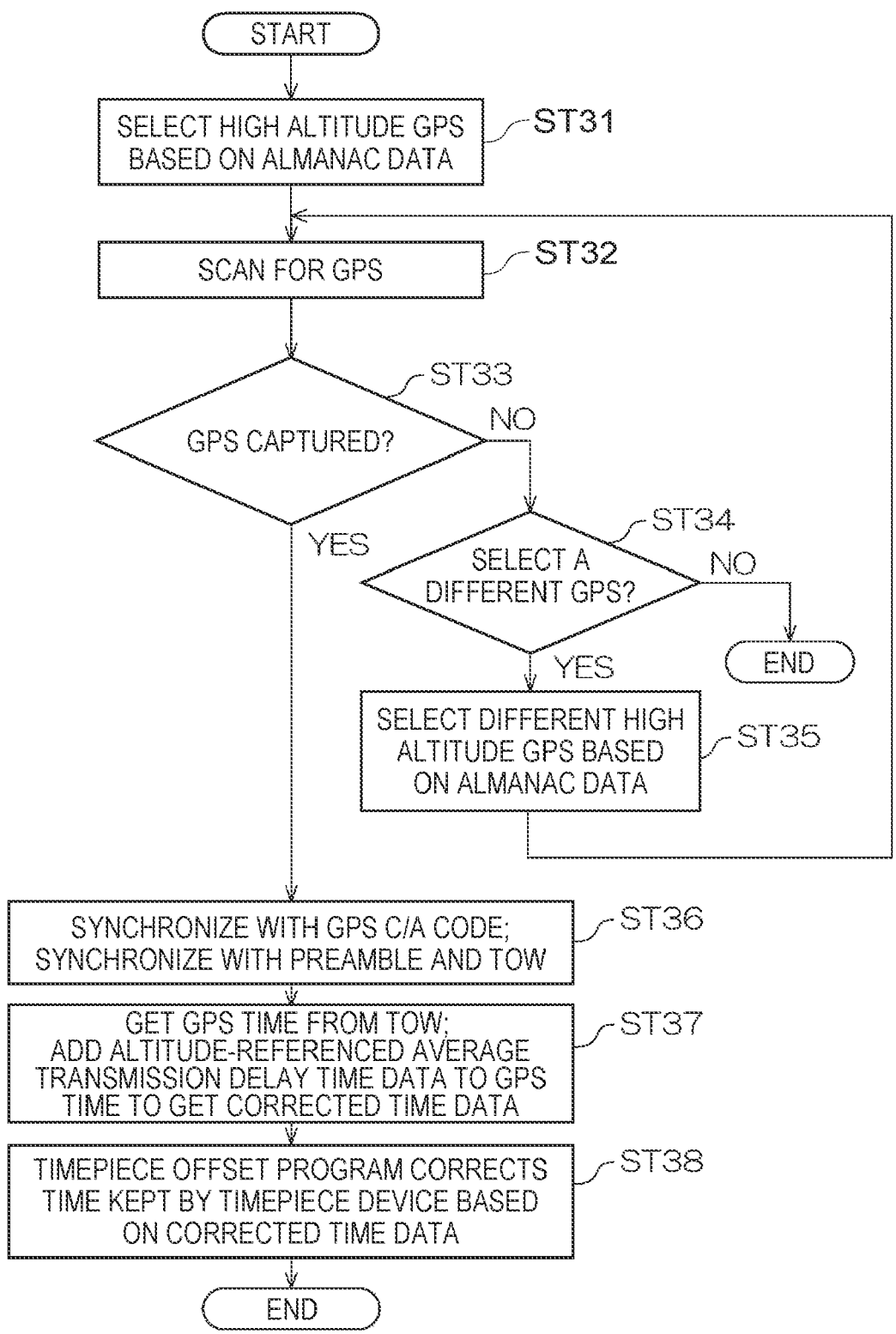
FIG. 9 is a flow chart of the outdoor reception sequence shown in FIG. 8.

The outdoor reception sequence executed as step ST3 in FIG. 8 is described next using FIG. 9. FIG. 9 is a flow chart of the outdoor reception sequence shown in FIG. 8.

First, as shown in step ST31, a high altitude GPS satellite is selected based on the almanac data. More specifically, a signal from a GPS satellite 15 at a high altitude is preferably received in the outdoor reception sequence, and this embodiment of the invention determines the altitude of the GPS satellites GPS satellite 15 from the almanac data.

The almanac data describes the orbits of all of the GPS satellites 15 orbiting the Earth. As a result, which GPS satellite 15 is located at what altitude (angle of elevation) at what time in a particular region (such as Japan) can be determined from the almanac data.

This almanac data is the almanac data 42a shown in FIG. 6, and the almanac data 42a is stored in the almanac data storage unit 42.

More specifically, based on the almanac data 42a in FIG. 6, the high altitude satellite selection program 33 in FIG. 5 selects, for example, one GPS satellite 15 at a high altitude at the current location (such as in Japan) of the GPS wristwatch 10.

By thus selecting a high altitude GPS satellite 15 based on the almanac data 42a, which is highly accurate information related to the altitude of the GPS satellites 15, this embodiment of the invention can select a high altitude GPS satellite 15 with high precision.

The high altitude satellite selection program 33 is an example of a positioning information satellite selection unit whereby the reception unit (GPS receiver 19) selects a positioning information satellite (such as a GPS satellite 15) based on the reception environment information (information indicating whether the GPS wristwatch 10 is indoors or outdoors).

The almanac data 42a is an example of the satellite orbit information describing the orbits on which all of the positioning information satellites (GPS satellites 15) orbit the Earth.

The high altitude satellite selection program 33 is an example of an arrangement whereby the reception unit (GPS receiver 19) selects the positioning information satellite (GPS satellite 15) from which to receive signals based on the reception environment information (information indicating whether the GPS wristwatch 10 is indoors or outdoors) and the satellite orbit information (almanac data 42a).

The high altitude satellite selection program 33 is also an example of an arrangement for selecting a high altitude positioning information satellite (GPS satellite 15) from the satellite orbit information (almanac data 42a) when the environmental information (power generation data 51a) is outdoor location information.

Step ST31 is an example of a positioning information satellite selection process.

Next in step ST32 in FIG. 9 the GPS wristwatch 10 scans for the GPS satellite 15 selected in step ST31. More specifically, the GPS wristwatch 10 searches for the GPS satellite 15 based on the almanac data 42a for the GPS satellite 15 selected in step ST31.

Step ST33 then determines if the GPS satellite 15 was successfully captured. If not, control goes to step ST34.

Step ST34 determines if plural GPS satellites 15 were selected by the high altitude satellite selection program 33 in step ST31. If another GPS satellite 15 is selected, the GPS wristwatch 10 scans again for the GPS satellite 15 in step ST32 based on the almanac data 42a for the GPS satellite 15.

If step ST33 determines that a high altitude satellite selection program 33 was successfully captured, control goes to step ST36 and the signal from the GPS satellite 15 is received. The satellite signal from the GPS satellite 15 is described first below before describing this step ST36.

Figure 13A:
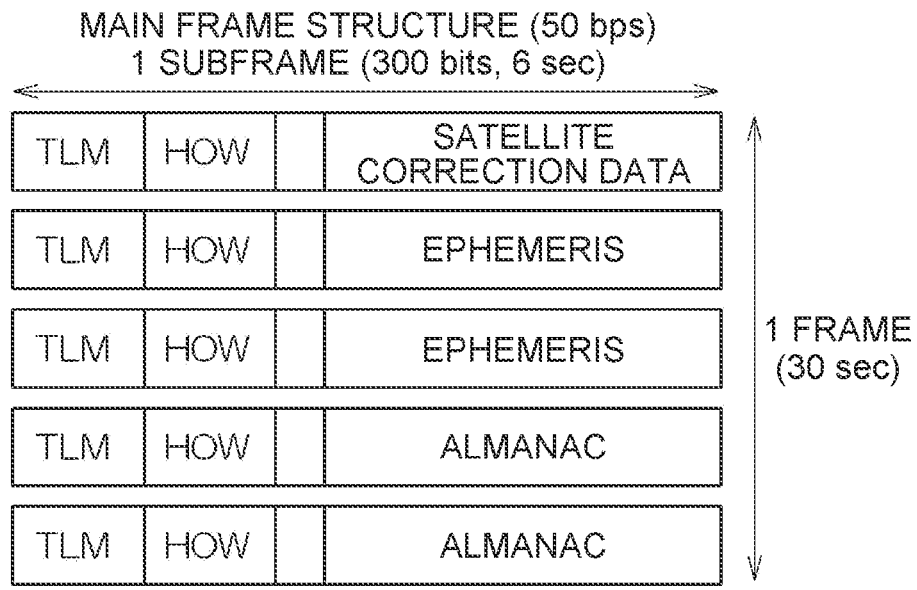
FIG. 13 describes a GPS satellite signal.

FIG. 13 schematically describes the satellite signals transmitted by the GPS satellites 15. As shown in FIG. 13A, each GPS satellite 15a transmits signals in data frame units and transmits one frame every 30 seconds. Each frame consists of five subframes, and one subframe is transmitted every 6 seconds. Each subframe contains 10 words (1 word is transmitted every 0.6 second).

Figure 13B:
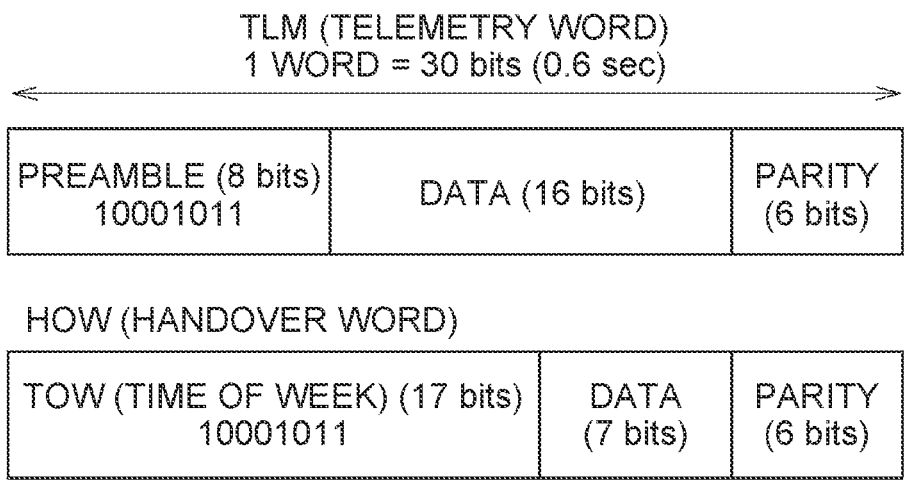

The first word in each subframe is a telemetry (TLM) word storing the TLM data, and each TLM word starts with a preamble as shown in FIG. 13B.

The TLM word is followed by a handover word HOW storing the HOW (handover) data, and each HOW starts with the time of week (TOW) indicating the GPS time information of the GPS satellite.

The GPS time is the number of seconds since 00:00:00 Sunday night, and is reset to zero at precisely 00:00:00 every Sunday night. The same GPS week number is added to the GPS time throughout the week, and the GPS receiver can therefore get the precise GPS time from the week number and the elapsed time (number of seconds). The GPS time is referenced to the Coordinated Universal Time (UTC).

The receiver must synchronize with the signal from the GPS satellite 15a in order to receive the frame data from a particular GPS satellite 15, and the C/A code is used for synchronization with 1 ms precision. The C/A code is a 1023-chip pseudo random noise code that repeats every 1 ms.

To use these signals transmitted from the GPS satellites 15, this embodiment of the invention phase synchronizes with the C/A code from the selected GPS satellite 15 and synchronizes with the preamble of the TLM word and the TOW in the HOW word shown in FIG. 13B in step ST36 in FIG. 9.

More specifically, the single-satellite capture/synchronization program 34 in FIG. 5 runs to synchronize with the preamble of the TLM word and the TOW in the HOW word.

Control then goes to step ST37. In step ST37 the GPS time is acquired from the received TOW.

This embodiment of the invention acquires only the TOW denoting the GPS time data, and does not acquire all of the subframe data, such as the ephemeris (detailed information about the orbit of each GPS satellite 15) and the almanac data (general information about the orbits of all GPS satellites 15) shown in FIG. 13A, and the UTC data (Coordinated Universal Time).

More specifically, the GPS time acquisition program 35 shown in FIG. 5 acquires the GPS time information described above and stores it as the GPS time data 52a in the GPS time data storage unit 52 in FIG. 7.

This embodiment of the invention therefore enables the GPS receiver 19 of the GPS wristwatch 10 to receive the GPS satellite 15 signal in an extremely short time, and enables significantly reducing power consumption.

The reception unit (GPS receiver 19) is thus an arrangement for acquiring satellite time information (GPS time) from a positioning information satellite (GPS satellite 15). Step ST36 is an example of a reception process whereby the reception unit of the electronic device receives satellite signals.

An almanac-referenced transmission delay time is then added to the acquired GPS time data 52a in step ST37 to get the correct time.

This almanac-referenced transmission delay time is described next. Because the ephemeris is not acquired from the GPS satellite 15 in this embodiment of the invention, the distance between the GPS satellite 15 and the GPS receiver 19 (GPS wristwatch 10) cannot be calculated, and the transmission delay time from when the signal is transmitted from the GPS satellite 15 and reaches the GPS receiver 19 therefore cannot be calculated.

This embodiment of the invention therefore stores transmission delay time data corresponding to differences in altitude. More specifically, when the position of the GPS satellite 15 is near the horizon, the signal transmission delay time is greater than when the satellite is at the zenith (directly overhead). The signal transmission delay time adjusted for changes in the altitude of the GPS satellite 15 is therefore averaged and stored as the corrected time data 53a in the altitude-referenced average transmission delay time data storage unit 43 in FIG. 6.

The corrected time calculation program 36 shown in FIG. 5 is therefore arranged to get the GPS time data 52a received in step ST37 and the altitude-referenced average transmission delay time data 43a for the altitude of the GPS satellite 15 (acquired from the almanac data 42a), and add the altitude-referenced average transmission delay time data 43a to the GPS time data 52a to calculate the correct time.

The calculated correct time is then stored as the corrected time data 53a in the corrected time data storage unit 53.

The corrected time data is thus a highly accurate time value matching the time kept by the atomic clock on-board the GPS satellite 15.

The altitude-referenced average transmission delay time data 43a is thus an example of satellite-configuration-related transmission delay time information that relates the transmission delay time information, which is the time required for the satellite signal transmitted from the positioning information satellite (GPS satellite 15) to reach the reception unit (GPS receiver 19), to the altitude of the positioning information satellite (GPS satellite 15).

The corrected time calculation program 36 is an example of a time correction information generating unit that generates time correction information (corrected time data 53a) based on the satellite time information (GPS time data 52a) and satellite altitude-related transmission delay time information (altitude-referenced average transmission delay time data 43a).

The corrected time data 53a in FIG. 7 is an example of time correction information for adjusting the time.

Step ST37 is an example of a time correction information generating step.

Control then goes to step ST38. In step ST38 the timepiece offset program 37 shown in FIG. 5 adjusts the time of the timepiece device 18 based on the corrected time data 53a in FIG. 7.

The outdoor reception sequence can thus quickly capture a high altitude GPS satellite 15 and adjust the time with high precision by simply receiving the TOW signal. The GPS wristwatch 10 can thus reduce power consumption while at the same time also adjusting the time with high precision.

This completes the outdoor reception sequence executed as step ST3 in FIG. 8.

The ephemeris data is not acquired in step ST36 in this embodiment of the invention, but the invention is not so limited and the ephemeris data can be acquired from the synchronized subframes of the captured GPS satellite 15. In this case the position of the GPS wristwatch 10 will also be known, and the satellite distance and the transmission delay time can be calculated and compared with the transmission delay time actually measured by the timepiece device 18 to get the corrected time data and adjust the time kept by the timepiece device 18.

Figure 10:
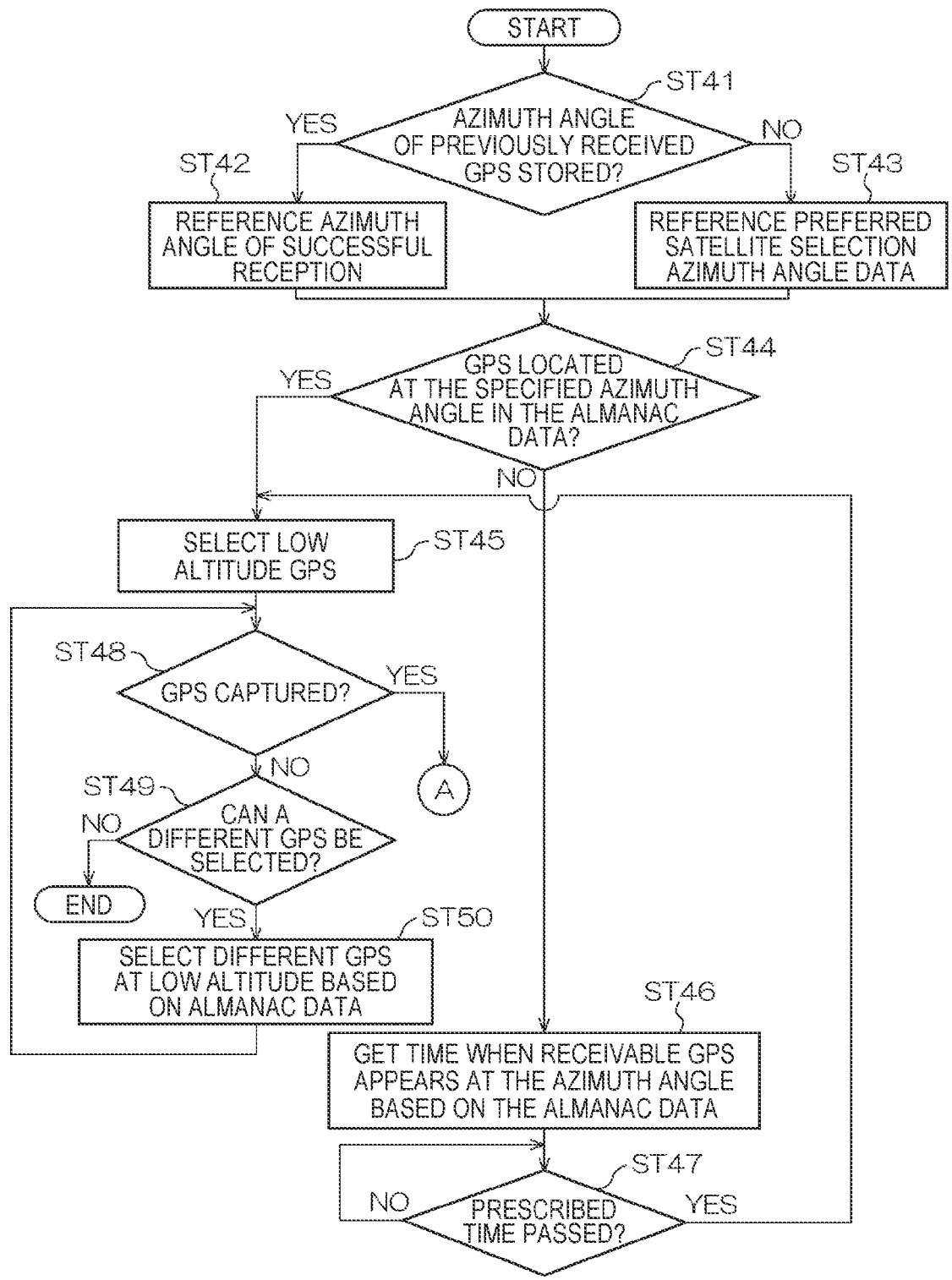
FIG. 10 is a flow chart of the indoor reception sequence shown in FIG. 8.
Figure 11:
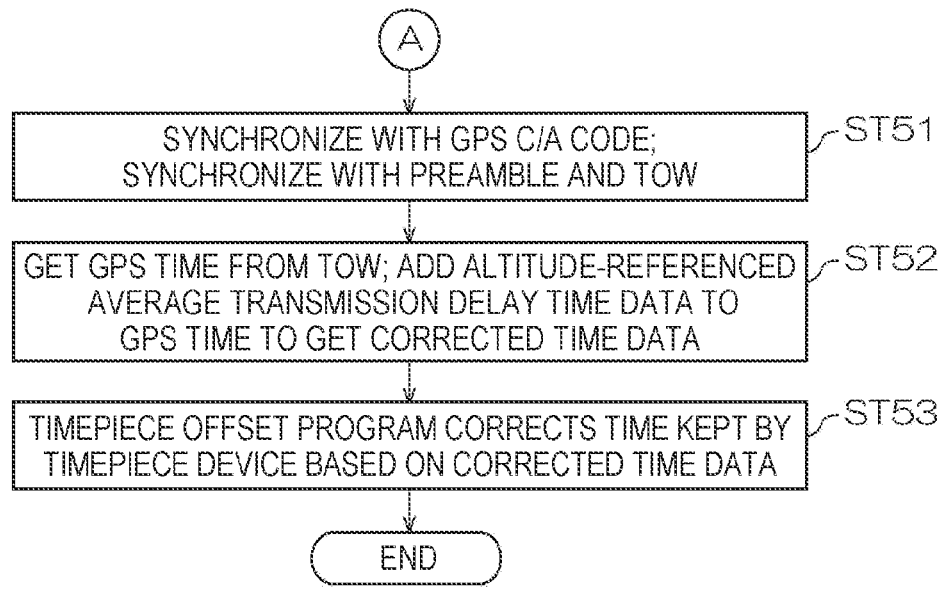
FIG. 11 continues the flow chart of the indoor reception sequence shown in FIG. 10.

The indoor reception sequence executed in step ST4 in FIG. 8 is described next. FIG. 10 and FIG. 11 are flow chart describing the indoor reception sequence shown in FIG. 8.

As shown in step ST41 in FIG. 10, the first step is to determine if the azimuth angle of the GPS satellite from which signals were previously received is known.

This is because a GPS satellite 15 can be captured more quickly by searching for a GPS satellite 15 at the same azimuth as the last successfully captured GPS satellite 15. This also reduces power consumption by eliminating unnecessary reception attempts.

More specifically, the azimuth angle at which a GPS satellite 15 signal was previously received is stored as the received-satellite azimuth angle data 44a in the received-satellite azimuth angle data storage unit 44 in FIG. 6.

The satellite-at-azimuth-angle determination program 38 in FIG. 5 refers to the received-satellite azimuth angle data 44a in FIG. 6 to determine if an azimuth angle is known.

If the received-satellite azimuth angle data 44a is detected, control goes to step ST42 and the data is referenced.

The received-satellite azimuth angle data 44a is an example of azimuth-of-reception information that is azimuth information for the positioning information satellite (GPS satellite 15) from which the reception unit (GPS receiver 19) previously received a signal.

However, if step ST41 determines that there is azimuth angle data for a previously received GPS satellite 15 signal, control goes to step ST43 and the preferred satellite selection azimuth angle data is referenced.

This preferred satellite selection azimuth angle is stored as the azimuth angle at which a GPS satellite 15 can be easily captured. A GPS satellite 15 can be quickly captured by searching for a GPS satellite 15 based on this preferred azimuth angle, and power consumption can therefore be reduced.

This preferred satellite selection azimuth angle is stored as the preferred satellite selection azimuth angle data 45a in the preferred satellite selection azimuth angle data storage unit 45 shown in FIG. 6.

More specifically, this data is referenced by the satellite-at-azimuth-angle determination program 38 in FIG. 5.

The preferred satellite selection azimuth angle data 45a is an example of specific azimuth information, which is azimuth information for the positioning information satellite (GPS satellite 15).

Control then goes to step ST44 in FIG. 10. The low altitude satellite selection program 39 references the almanac data in FIG. 6 based on the azimuth angle data received from step ST42 or ST43, and determines if a GPS satellite 15 is to be found at the prescribed azimuth angle at a particular time in a particular location (such as Japan). The low altitude satellite selection program 39 then stores the identified GPS satellite 15 as the azimuth angle/satellite correlation data 54a in FIG. 7 to the azimuth angle/satellite correlation data storage unit 54.

In step ST45 the low altitude satellite selection program 39 then selects one GPS satellite 15 at a low altitude (a small angle of elevation, such as 45 degrees) from the azimuth angle/satellite correlation data 54a.

A GPS wristwatch 10 located indoors can thus quickly select a GPS satellite 15 from which signals can be captured through a window in the building, for example. Reception is thus fast, and power consumption can be reduced.

The low altitude satellite selection program 39 is thus an example of a positioning information satellite selection unit for selecting a positioning information satellite (GPS satellite 15) at a low altitude from the satellite orbit information (almanac data 42a) when the environmental information (power generation data 51a) denotes an indoor location.

The low altitude satellite selection program 39 is also an example of a positioning information satellite selection unit for preferentially selecting a positioning information satellite (GPS satellite 15) matching the azimuth-of-reception information (received-satellite azimuth angle data 44a) when a low altitude positioning information satellite (GPS satellite 15) is selected from the satellite orbit information (almanac data 42a).

The low altitude satellite selection program 39 is also an example of a positioning information satellite selection unit for preferentially selecting a positioning information satellite (GPS satellite 15) matching specific azimuth information (preferred satellite selection azimuth angle data 45a) when a low altitude positioning information satellite (GPS satellite 15) is selected from the satellite orbit information (almanac data 42a).

If a capturable GPS satellite is not found at the azimuth angle in step ST44, control goes to step ST46 where the low altitude satellite selection program 39 references the almanac data 42a and gets the time at which a capturable GPS satellite 15 will appear at the azimuth angle.

Operation then pauses in step ST47 until the time when the satellite will appear, and the low altitude satellite selection program 39 then captures one low altitude GPS satellite 15 in step ST45.

The GPS receiver 19 is thus prevented from continuously searching unnecessarily when a GPS satellite 15 signal can be received at the specified azimuth angle but there is a delay until reception will be possible, the GPS receiver 19 is driven only for the necessary time, and signals can be received without unnecessary power consumption.

The almanac data 42a is thus an example of satellite time and movement information that is time-based movement information for the positioning information satellites (GPS satellites 15).

The low altitude satellite selection program 39 is an example of an arrangement that adds standby time based on the satellite time and movement information from the almanac data 42a and selects a positioning information satellite (GPS satellite 15).

When the low altitude satellite selection program 39 selects a low altitude GPS satellite 15 in step ST45, control goes to step ST48 and the single-satellite capture/synchronization program 34 in FIG. 5 operates and attempts to capture the selected GPS satellite 15.

If capturing the selected GPS satellite 15 fails, step ST49 determines if a different low altitude GPS satellite 15 can be selected. If possible, the different low altitude GPS satellite 15 is selected in step ST50.

Control then goes to step ST51 to ST53 in FIG. 11. These steps are the same as steps ST36 to ST38 in the outdoor reception sequence in FIG. 9, and further description thereof is thus omitted. As also described above, these steps can alternatively acquire the ephemeris data, and calculate and compare the satellite distance and transmission delay time with the transmission delay time actually measured by the timepiece device to get the time correction data.

As described above, a GPS wristwatch 10 according to this embodiment of the invention determines whether the reception environment is indoors or outdoors, can select, capture, and receive signals from an appropriate GPS satellite 15 from the almanac data 42a based on the indoor/outdoor determination, and can thus adjust the time with high precision and low power consumption. This embodiment of the invention is particularly beneficial in an electronic device such as a timepiece that requires very little power and setting the time with high precision.

Second Embodiment

Figure 14:
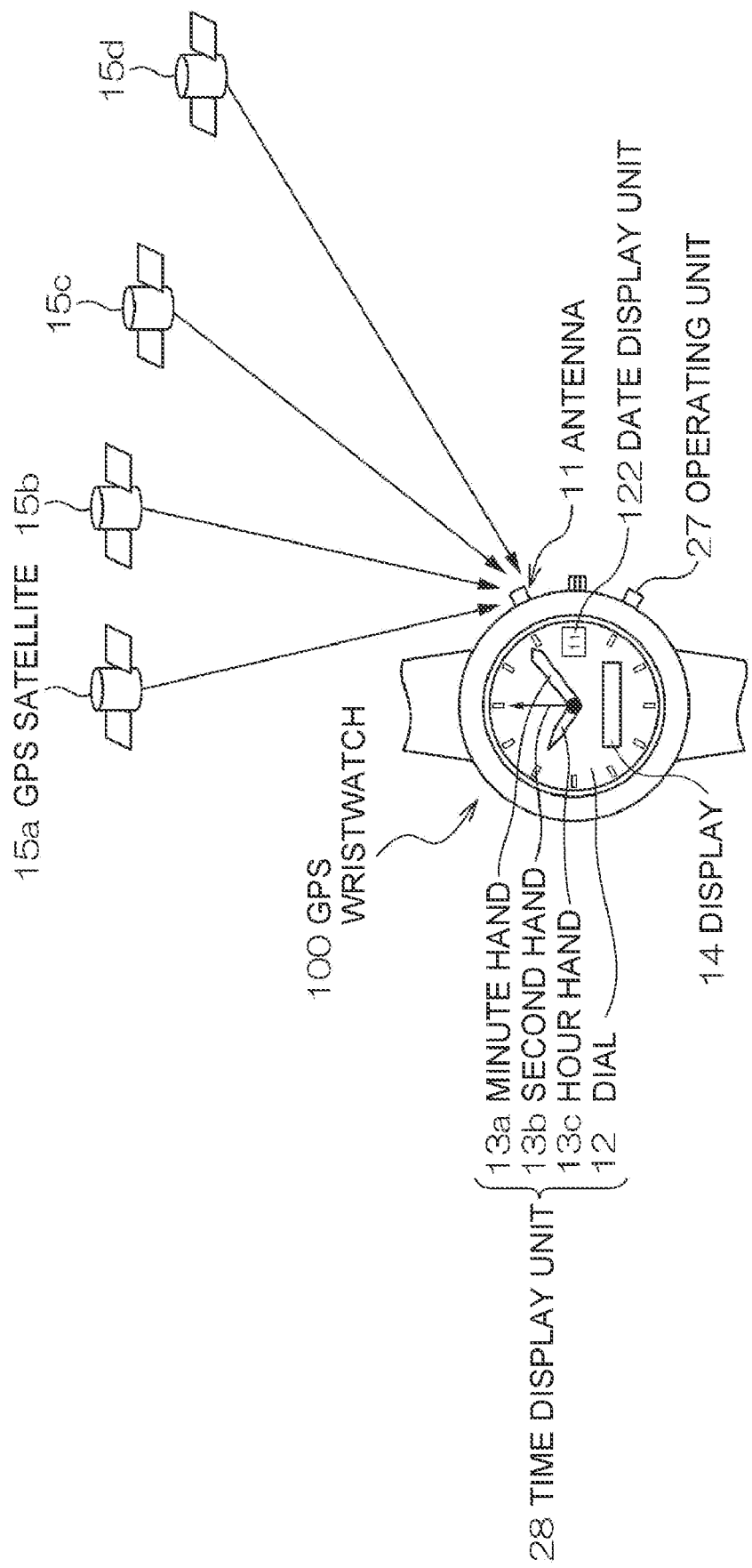
FIG. 14 is a schematic diagram of a wristwatch with a GPS time correction device as a second embodiment of an electronic device according to the present invention.
Figure 15:
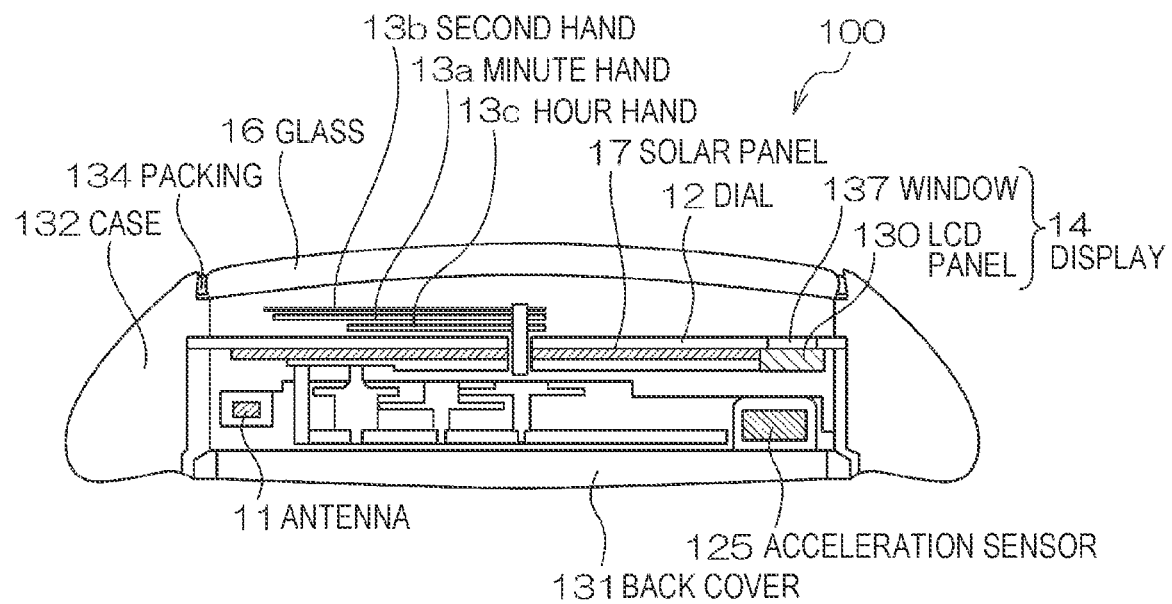
FIG. 15 is a side section view of the GPS wristwatch shown in FIG. 14.

FIG. 14 is a schematic diagram of a wristwatch with a GPS time correction device 100 (a "GPS wristwatch" below) as an example of a second embodiment of an electronic device according to the present invention. FIG. 15 is a side section view of the GPS wristwatch 100 shown in FIG. 14.

As shown in FIG. 14 and FIG. 15 this GPS wristwatch 100 has a dial 12, a time display unit 28 including a second hand 13b, a minute hand 13a, and an hour hand 13c, a display 14 composed of an LCD panel 130 on which messages are displayed, and a date display unit 122 on which the date is displayed. The GPS wristwatch 100 also has an operating unit 27 which the user operates in response to messages presented on the display 14.

Note that like parts in this second embodiment and the first embodiment are identified by the same reference numerals, duplicative description is omitted, and primarily the differences between the embodiments are described below.

The internal arrangement of the GPS wristwatch 100 is shown schematically in the section view in FIG. 15. A difference from the GPS wristwatch 10 of the first embodiment of the invention is that an acceleration sensor 125 is disposed in the space below the dial 12 and the back cover 131, and this acceleration sensor 125 is part of the acceleration sensor output signal generator 29 described below. The acceleration sensor 125 detects if the user of the GPS wristwatch 100 is moving. The dial 12 is therefore preferably transparent enough that sunlight can pass through to the operating unit 27.

As also shown in FIG. 14 and FIG. 15, the GPS wristwatch 100 has an antenna 11, and the antenna 11 is used to receive signals from the GPS satellites 15a, 15b, 15c, 15d travelling on prescribed orbits above the Earth in space.

These GPS satellites 15 are examples of positioning information satellites.

This is the same as in the first embodiment.

Figure 16:
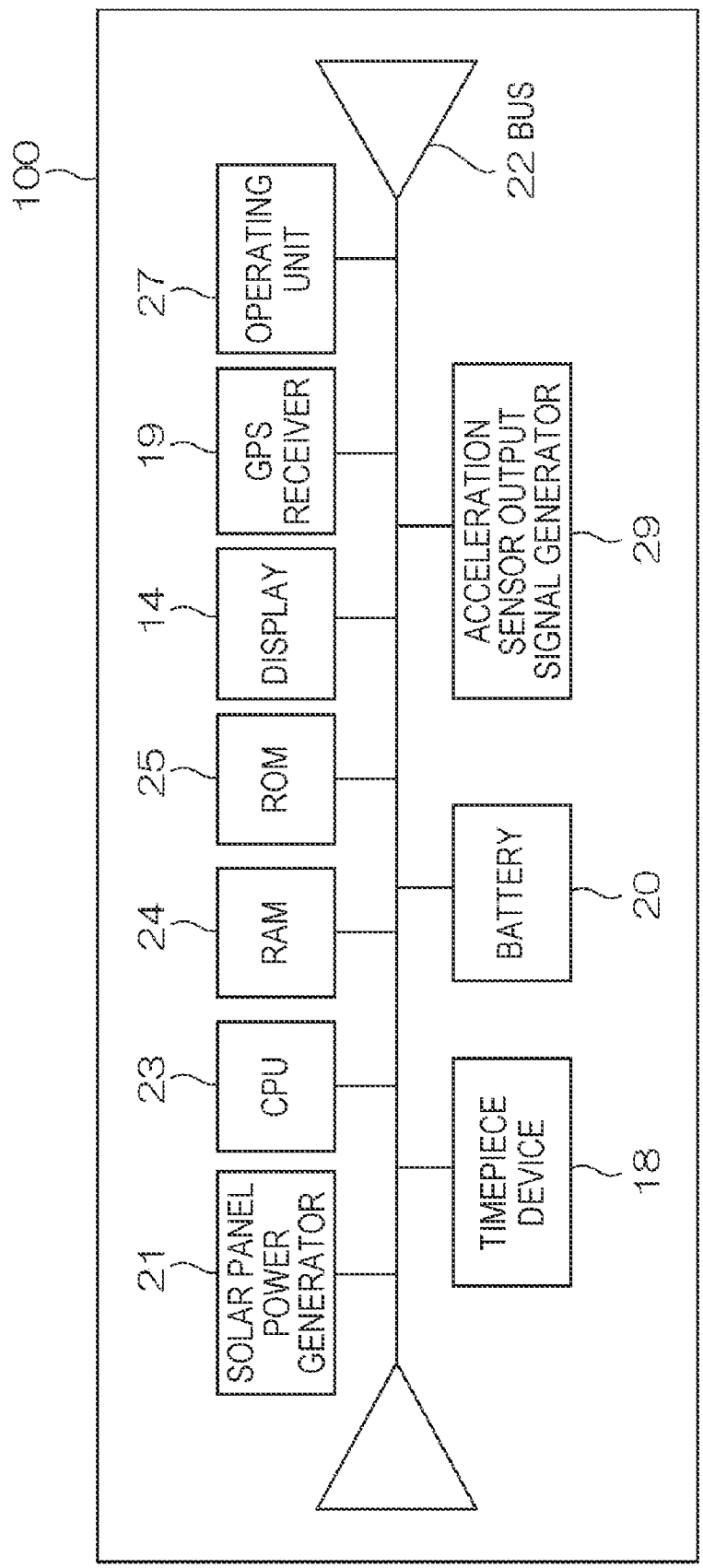
FIG. 16 is a block diagram showing the main internal hardware configuration of the GPS wristwatch shown in FIG. 14.

FIG. 16 is a block diagram showing the main internal hardware arrangement of the GPS wristwatch 100. More specifically, the GPS wristwatch 100 according to this embodiment of the invention is a so-called electronic timepiece as in the first embodiment of the invention.

The components shown in FIG. 16 are further described below.

As shown in FIG. 16, much of the arrangement of this GPS wristwatch 100 is the same as in the first embodiment. What differs is that the acceleration sensor output signal generator 29 is also connected to the bus 22 to detect the output of the acceleration sensor 125 and output a corresponding signal.

The display 14 shown in FIG. 14 is also connected to the bus 22.

The bus 22 is thus an internal bus with addresses, data paths, and functions for connecting all of the other devices as in the first embodiment of the invention.

Figure 17:
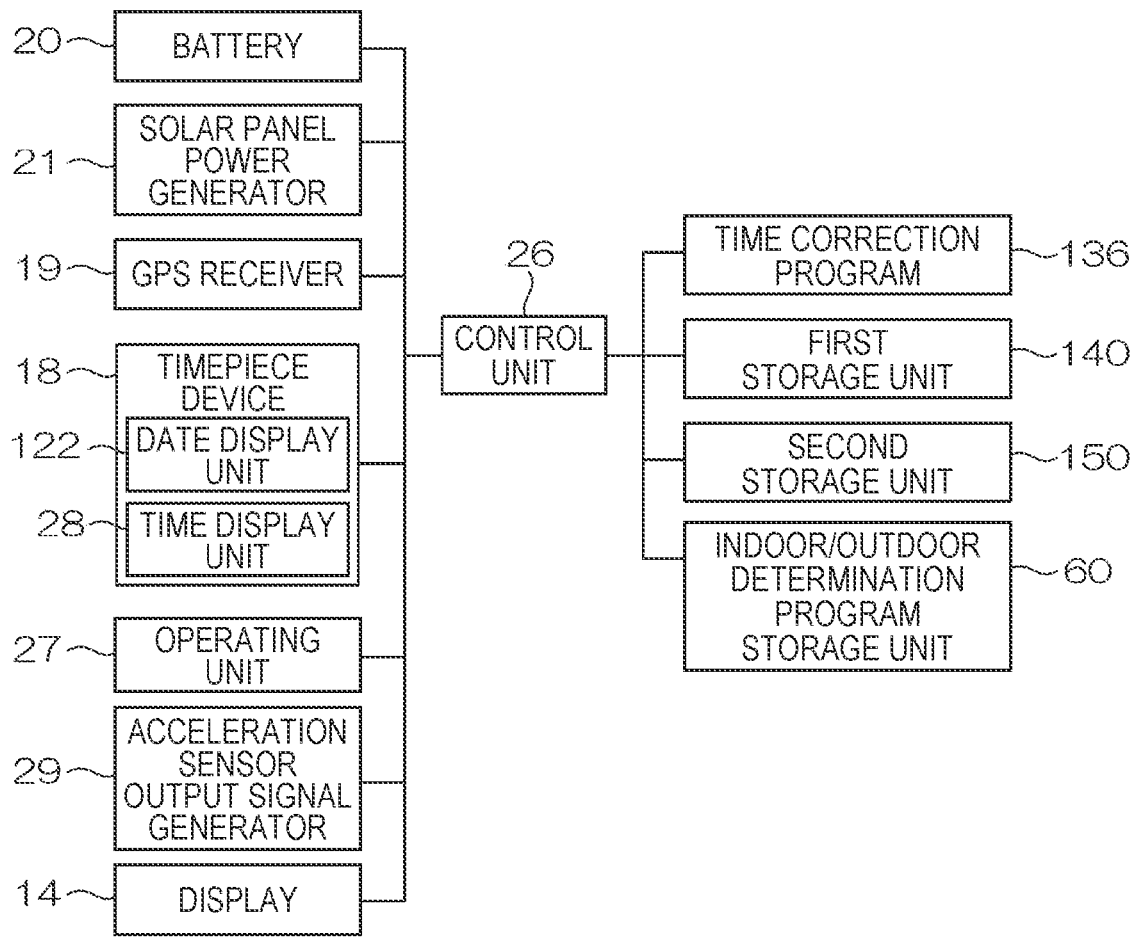
FIG. 17 is a general overview schematically showing the main software arrangement of the GPS wristwatch.

FIG. 17 to FIG. 20 are schematic diagrams showing the main software arrangement of the GPS wristwatch 100, FIG. 17 being a general overview.

As shown in FIG. 17 the GPS wristwatch 10 has a control unit 26. The control unit 26 controls the GPS receiver 19, the timepiece device 18, the battery 20, the solar panel charging device 21, and the acceleration sensor output signal generator 29, and processes the time correction program 136, data in the first storage unit 140, data in the second storage unit 150, and programs in the indoor/outdoor determination program storage unit 60.

Note that the time correction program 136, the first storage unit 140, the second storage unit 150, and the indoor/outdoor determination program storage unit 60 are shown as discrete units in FIG. 17, but in practice the data is not stored separately and is shown separately for convenience only.

Primarily data that is initially stored is stored in the first storage unit 140 shown in FIG. 17. Primarily data that results from processing the data stored in the first storage unit 140 by running the programs stored in the 160 is stored in the second data storage unit 150.

Figure 18:
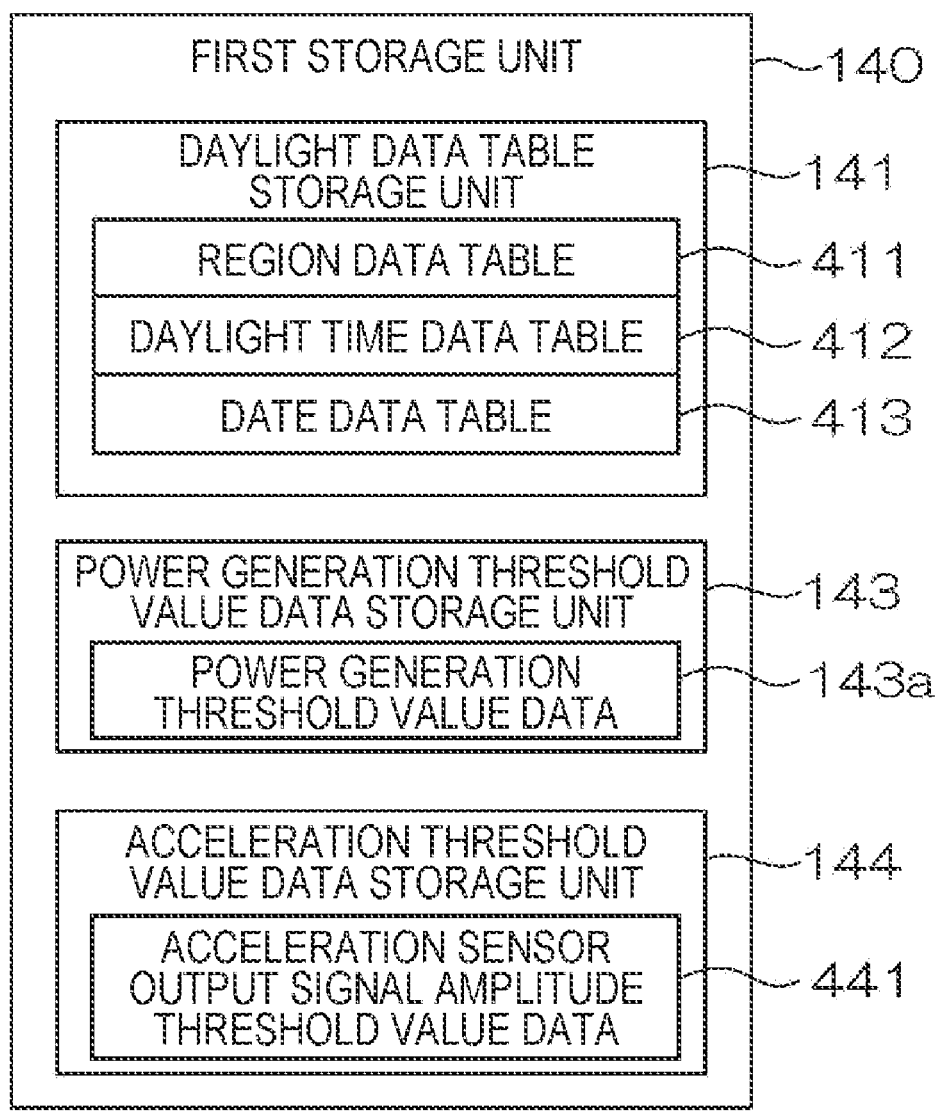
FIG. 18 is a schematic diagram of the data stored in the first data storage unit in FIG. 17.
Figure 19:
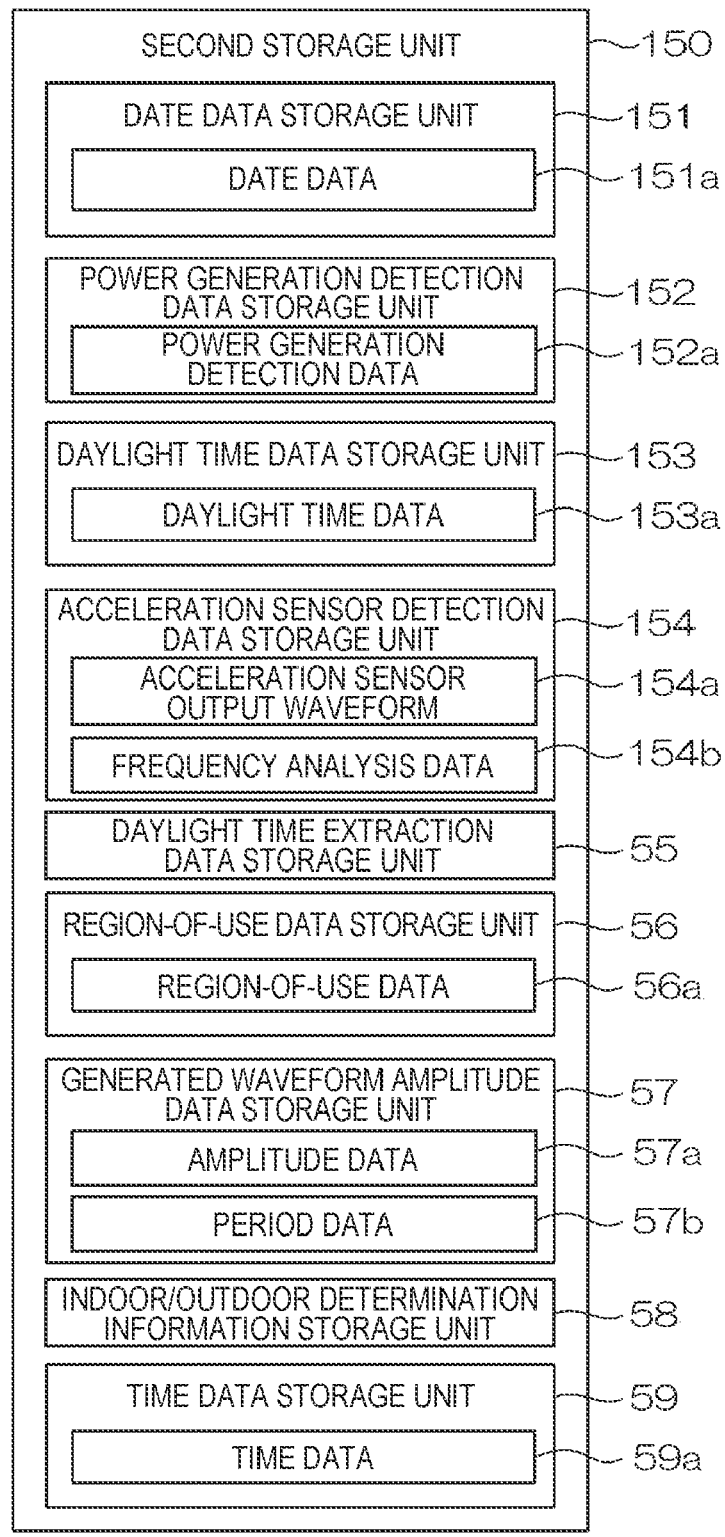
FIG. 19 is a schematic diagram of the data stored in the second data storage unit shown in FIG. 17.
Figure 20:
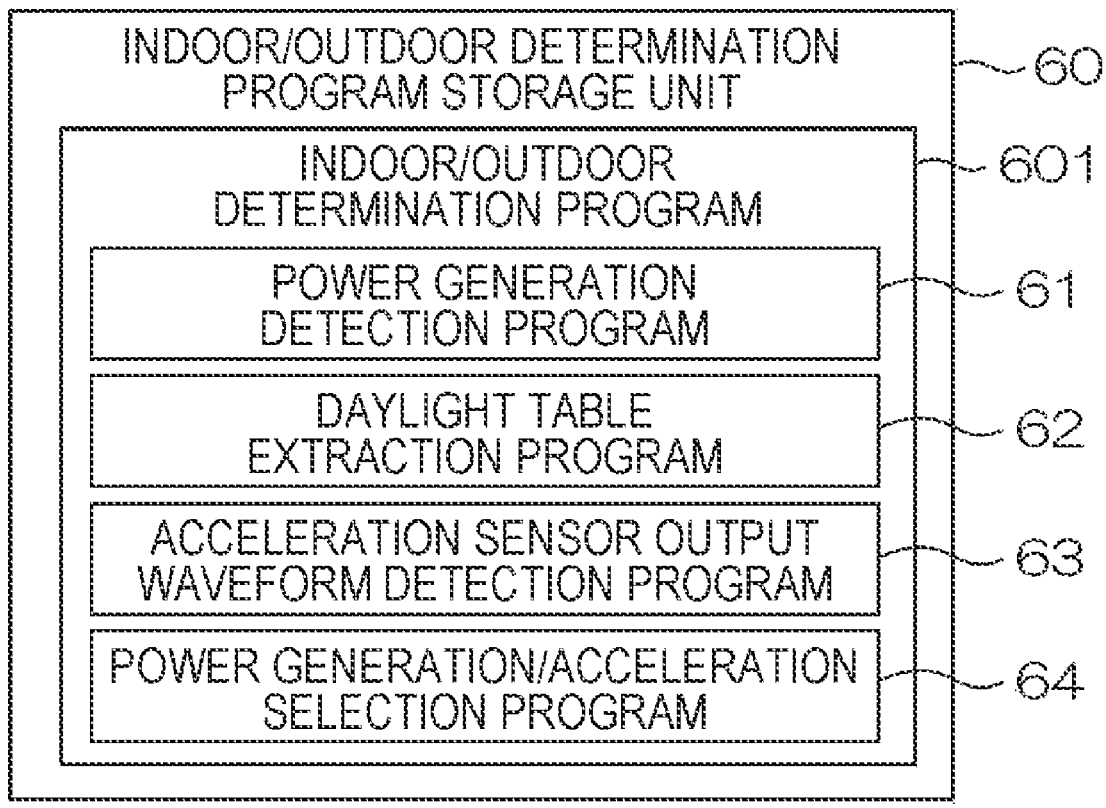
FIG. 20 describes the programs stored in the indoor/outdoor determination program storage unit in FIG. 17.

FIG. 18 is a block diagram of the data stored in the first storage unit 140 in FIG. 17, and FIG. 19 is a block diagram of the data stored in the second storage unit 150 in FIG. 17. FIG. 20 is a block diagram of the programs stored in the indoor/outdoor determination program storage unit 60 in FIG. 17.

FIG. 21 to FIG. 24 are flow charts describing the main steps in the operation of the GPS wristwatch 100 according to this embodiment of the invention.

The operation of the GPS wristwatch 100 according to this embodiment of the invention is described below with reference to the flow charts in FIG. 21 to FIG. 24 while also describing the related programs and data shown in FIG. 17 to FIG. 20.

The GPS wristwatch 100 shown in FIG. 14 is arranged to adjust the time kept by the timepiece device 18 at a particular time. The time is corrected by receiving a signal from a GPS satellite 15 as further described below.

Before receiving a signal from a GPS satellite 15a, the GPS wristwatch 100 therefore first determines if a GPS satellite 15a can be received, that is, whether the GPS wristwatch 100 is indoors or outdoors. To accomplish this, one or a plurality of programs stored in the indoor/outdoor determination program storage unit 60 are selected and executed as shown in step ST11 in FIG. 21. Note that references to one or more of the programs in the indoor/outdoor determination program storage unit 60 below refer to the indoor/outdoor determination program 601, and the indoor/outdoor determination program 601 is described as the selected program when any of these programs is further described below.

Control then goes to step ST12 to determine if the indoor/outdoor determination program 601 ended normally. If the program ended normally, the GPS wristwatch 100 is determined to be outdoors where GPS satellite 15a signal reception is possible and control goes to step ST15 to capture signals from at least four GPS satellites 15a. More specifically, the GPS receiver 19 in FIG. 16 operates to receive GPS signals through the antenna 11 and search for a capturable GPS satellite 15a. Control then goes to step ST16, the time correction program 136 in FIG. 17 executes, and control goes to step ST17 where the time is adjusted as described below.

The satellite signals transmitted from the GPS satellites 15a is the same as the satellite signal transmitted by the GPS satellite 15 described above in the first embodiment with reference to FIG. 13.

Figure 21:
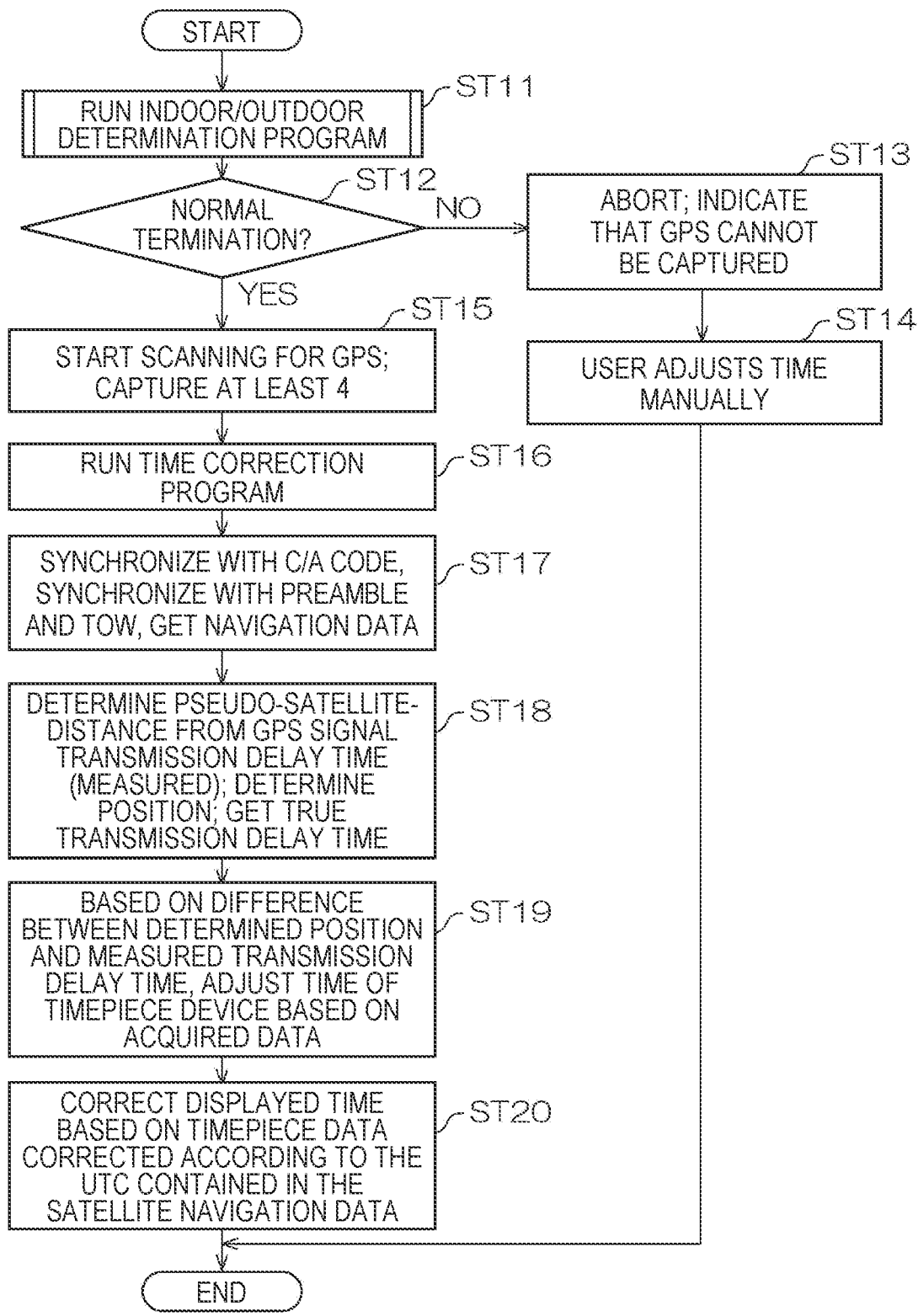
FIG. 21 is a flow chart describing the main operation of the GPS wristwatch according to the second embodiment of the invention.

As shown in step ST17 in FIG. 21, this embodiment of the invention therefore synchronizes with the C/A codes from the GPS satellites 15a and synchronizes with the preamble of the TLM word and the TOW in the HOW word. The GPS wristwatch 100 then gets the navigation data from the four GPS satellites 15a.

Next, in step ST18, the transmission delay time of the signals from the four GPS satellites 15a (the time required for the signals from the GPS satellites to reach the GPS wristwatch 100) is calculated using the timepiece device 18, and the pseudo-satellite-distance between each of the GPS satellites 15a and the GPS wristwatch 100 is calculated based on the speed of light (c).

Next, based on the pseudo-satellite-distance to each of the four GPS satellites 15a, the position of the GPS wristwatch 100, the altitude, and the true transmission delay time are calculated using four simultaneous equations, and the position and positioning information of the GPS wristwatch 100 and the true transmission delay time are calculated.

The true transmission delay time and the transmission delay time actually measured by the timepiece device 18 can thus be determined.

The time until the signals transmitted from the four GPS satellites 15a are received is thus based on the actually measured transmission delay time. The GPS wristwatch 100 positioning information and the true transmission delay time that are determined by calculation, and the transmission delay time that was measured by the timepiece device 18, are then generated.

Then in step ST19 the timepiece device 18 is offset (adjusted) based on the difference between the calculated transmission delay time and the transmission delay time that was actually measured using the internal clock of the timepiece device 18.

Next, as shown in step ST20, the time displayed on the time display unit 28 on the dial 12 shown in FIG. 14 is adjusted based on the data from the timepiece device 18 that was corrected based on the UTC reference time acquired from the GPS satellites 15a, and the time display of the time display unit 28 is a time information adjustment and display unit.

As a result, the time, such as the time in Japan, is displayed to account for the time difference.

This completes adjusting the time using four satellites. The time kept by the GPS wristwatch 100 can therefore be adjusted with high precision because the timepiece device 18 of the GPS wristwatch 100 is adjusted according to the time information received from GPS satellites 15a that have an on-board atomic clock.

If step ST12 determines that the indoor/outdoor determination program has not terminated normally, control goes to step ST13, the indoor/outdoor determination program 601 is aborted, and a message is displayed on the display 14 to inform the user that signals from a GPS satellite cannot be captured. A message prompting the user to manually adjust the time is then displayed in step ST14, and the operation ends.

This completes adjusting the time in FIG. 21.

This embodiment of the invention is described above using four or more plural satellites to adjust the time, but the invention is not so limited and the time can be adjusted using one satellite.

In this case it is assumed that the current position, and specifically the position of the GPS wristwatch 100, is already known. The GPS wristwatch 100 therefore captures a single satellite, synchronizes to the C/A code, synchronizes to the preamble and TOW, and gets the ephemeris. The position of the captured GPS satellite 15a on its orbit is then determined from the acquired ephemeris. The true transmission delay time (pseudo-satellite-distance) of the signal from the GPS satellite 15a is then calculated with reference to the known position of the GPS wristwatch 100.

The transmission delay time of the signal actually received from the GPS satellite 15a is then determined using the timepiece device. This enables acquiring both the actual transmission delay time and the true transmission delay time. Subsequent steps are the same as steps ST18 and ST19 in FIG. 21 using four satellites. The single-satellite time correction mode thus ends.

The single-satellite time correction mode requires capturing and receiving data from only one GPS satellite 15a. Power consumption can therefore significantly reduced compared with capturing four GPS satellites 15a. Correcting the time using four satellites and correcting the time using a single satellite can also be used in combination to reduce power consumption while continuing to correct the time with high precision.

The indoor/outdoor determination program 601 is described next below.

The indoor/outdoor determination program 601 runs in step ST11 in FIG. 21. This indoor/outdoor determination program 601 relates to (a) the power generation detection program 61 in FIG. 20 and the flow chart in FIG. 22 describing the operation of the solar panel charging device 21 shown in FIG. 16 and FIG. 17; (b) the acceleration sensor output waveform detection program 63 in FIG. 20 and the flow chart in FIG. 23 describing the operation of the acceleration sensor output signal generator 29 shown in FIG. 16 and FIG. 17; and (c) the daylight table extraction program 62 and power generation/acceleration selection program 64 shown in FIG. 20 and the flow chart in FIG. 24 describing the operation of these programs in conjunction with the foregoing power generation detection program 61 and acceleration sensor output waveform detection program 63.

Determining whether the current location of the GPS wristwatch 100 is indoors or outdoors is necessary because, for example, the reception operation starts if the GPS wristwatch 100 attempts to receive signals from a GPS satellite 15a orbiting above the Earth in order to adjust the time even though the GPS wristwatch 100 is indoors. The reception operation is also usually set to try a plurality of times, and the reception operation therefore does not end immediately even if the reception unit fails to receive a signal. As the reception operation repeats, power continues to be consumed. Because the capacity of the battery used in small devices such as the GPS wristwatch 100 is usually not very large, the battery is soon depleted and the operating time of the device is short.

To prevent this, if the indoor/outdoor determination program 601 determines that the GPS wristwatch 100 is indoors, the reception unit does not execute the reception operation, and the reception operation starts only when the GPS wristwatch 100 is determined to be outdoors. This assures that the reception operation runs efficiently, power is not wasted, and it takes a longer time for the battery to become depleted. This enables incorporating a GPS receiver in small devices having limited battery capacity.

The indoor/outdoor determination program 601 is described next below.

Power Generation Detection Program 61

Operation when the power generation detection program 61 in FIG. 20 is selected as the indoor/outdoor determination program 601 is described first below.

Figure 22:
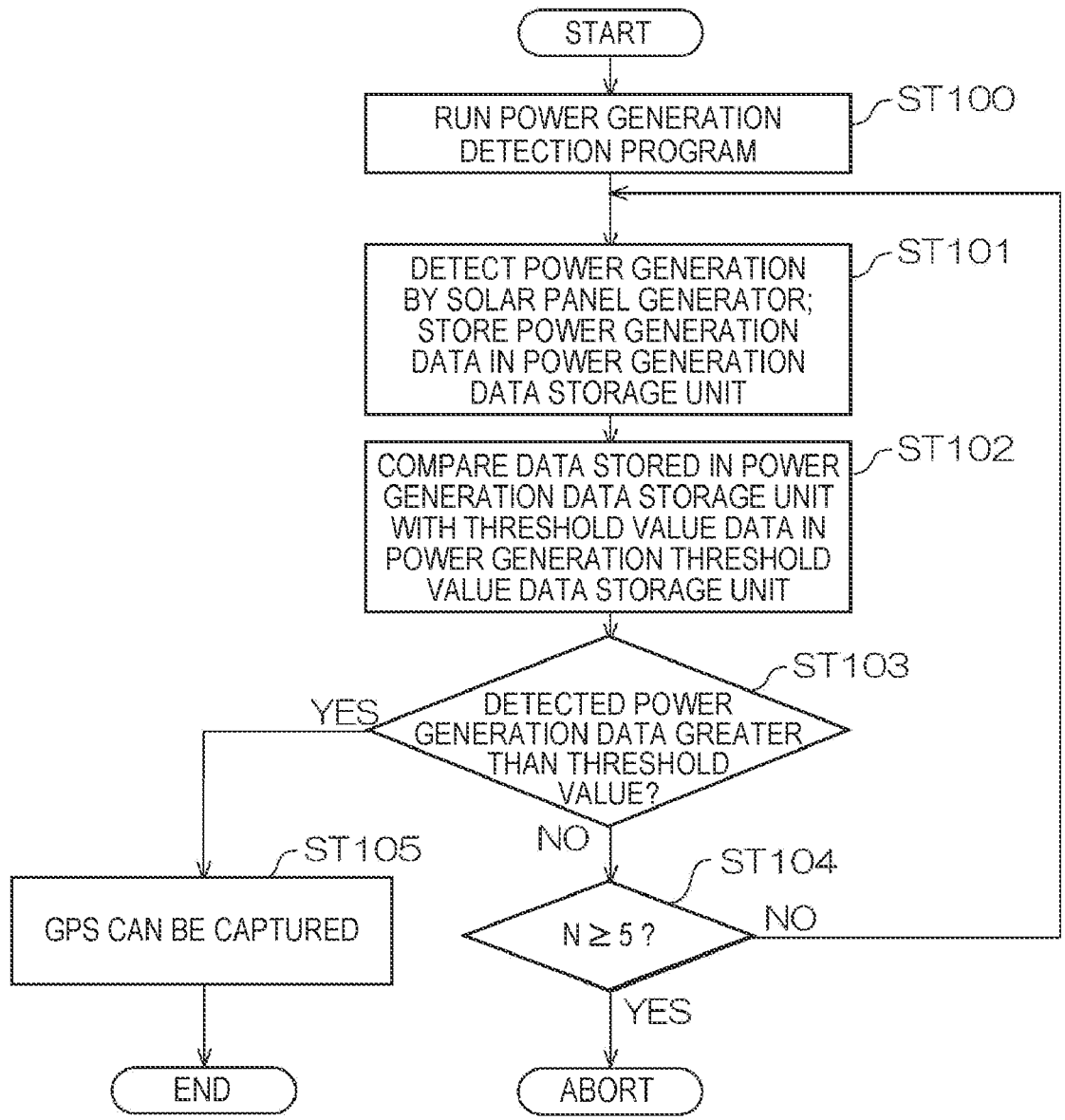
FIG. 22 is a flow chart showing the sequence of the power generation detection program as the indoor/outdoor determination unit in FIG. 21.
Figure 23:
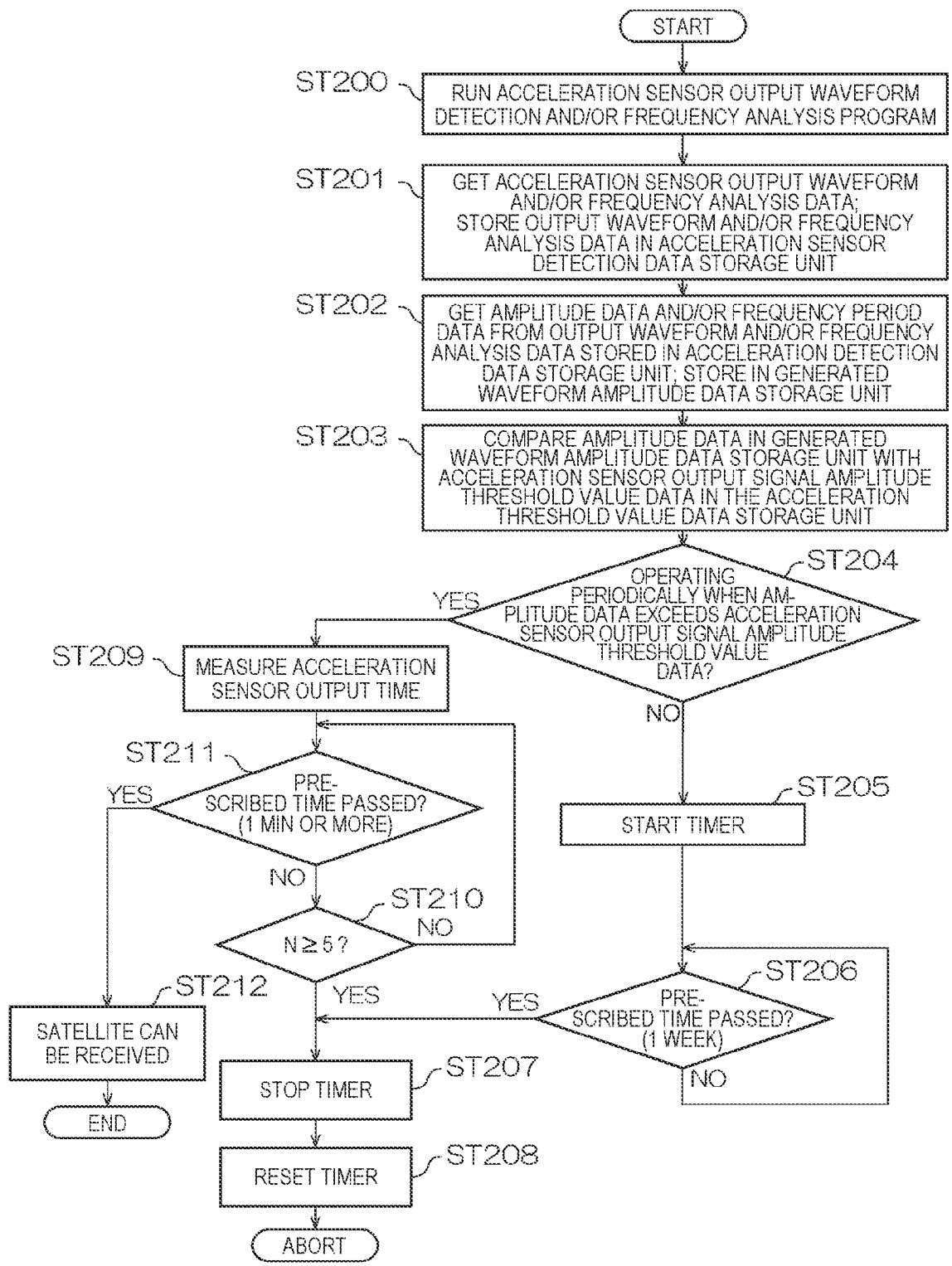
FIG. 23 is a flow chart showing the sequence of the acceleration detection program as the indoor/outdoor determination unit in FIG. 21.

The power generation detection program 61 relates to the solar panel charging device 21 shown in FIG. 16 and FIG. 17, and the operation is shown in the flow chart in FIG. 22.

When the indoor/outdoor determination program 601 in step ST11 in FIG. 21 runs in this case, the power generation detection program 61 in FIG. 20 is selected. The power generation detection program 61 then executes in step ST100 in FIG. 22, and the GPS wristwatch 100 determines whether it is indoors or outdoors based on the power generated by the solar cell.

More specifically, because power generation increases if the GPS wristwatch 100 is outdoors and decreases if indoors, this aspect of the invention tries to determine if the device is indoors or outdoors based on the power produced by the solar cell.

As shown in FIG. 12 and described in the first embodiment, a value of 0.5 (lx), for example, is stored as the power generation threshold value data 143*a* in the power generation threshold value data storage unit 143 shown in FIG. 18 in this embodiment of the invention, the GPS wristwatch 100 is determined to be outdoors if the power output detected by the solar panel charging device 21 is greater than or equal to 0.5 (lx), and the GPS wristwatch 100 is determined to be indoors if the power output is less than 0.5 (lx).

More specifically, the power generation detection program 61 runs in step ST100. Then in step ST101 the power generation detection program 61 detects the power output of the solar panel charging device 21 and stores the result in the power generation detection data storage unit 152 in FIG. 19. Next, in step ST102, the power generation detection program 61 compares the power generation detection data 152*a* in the power generation detection data storage unit 152 in FIG. 19 with the power generation threshold value data 143*a* in the power generation threshold value data storage unit 143 in FIG. 18. More specifically, the power generation detection program 61 determines if the relative power output denoted by the power generation detection data 152*a* in FIG. 19 is greater than or equal to the 0.5 (lx) shown in FIG. 12.

If the power generation detection data 152*a* is greater than or equal to than the power generation threshold value data 143*a* (0.5 (lx)) (step ST103 returns Yes), control goes to step ST105 where it is determined that an GPS satellite can be captured, that is, that the GPS wristwatch 100 is outdoors, and the power generation detection program 61 ends. Control then returns to step ST12 in FIG. 21, which determines that the power generation detection program 61 selected as the indoor/outdoor determination program 601 terminated normally and thus passes control to step ST15. The GPS satellite scan then begins and four or more GPS satellites are captured. The position of the GPS wristwatch 100 is then determined by steps ST16 to ST20, and the time is adjusted.

However, if in step ST103 the power generation detection data 152*a* is less than the power generation threshold value data 143*a* (<0.5 (lx)), control goes to step ST104 and steps ST101 to ST103 repeat for a prescribed number of times, such as until N=5 in this aspect of the invention. If the power generation detection data 152*a* is less than the power generation threshold value data 143*a* (0.5 (lx)) five or more times, the power generation detection program 61 is aborted. Control then returns to step ST12 in FIG. 21.

Because the program did not terminate normally in this case, control goes to step ST13, a message telling the user that a GPS satellite cannot be captured is displayed, a prompt telling the user to manually adjust the time is displayed in step ST14 as described above, and operation ends.

The GPS wristwatch 100 in this aspect of the invention is thus arranged to determine with good precision whether the GPS wristwatch 100 is indoors or outdoors.

As described above, the power generation detection program 61 is an example of an indoor/outdoor determination unit that acquires power generation detection data 152*a*, which is information about the environment of the reception unit (GPS receiver 19), and evaluates the reception environment (whether indoors or outdoors) of the reception unit (GPS receiver 19) based on this power generation detection data 152*a*.

If reception is possible, the reception unit executes the reception operation, determines the current position, and adjusts the time. If reception is not possible, the reception unit does not execute the reception operation and can thus suppress power consumption.

Furthermore, by storing the time band when the power generation detection program 61 determines that the power generation detection data 152*a* is greater than or equal to the threshold value of the power generation threshold value data 143*a*, and the time band that the power generation detection data 152*a* is less than the power generation threshold value data 143*a*, in the indoor/outdoor determination information storage unit 58 in FIG. 19, the time band in which the positioning information satellite can be captured can be determined from the time band information in the indoor/outdoor determination information storage unit 58. This is convenient for the user because it is not always necessary to determine when a positioning information satellite can be captured by detecting the power output of the solar panel charging device 21.

Acceleration Sensor Output Waveform Detection Program 63

Operation when the acceleration sensor output waveform detection program 63 in FIG. 20 is selected as the indoor/outdoor determination program 601 in FIG. 20 is described next. The acceleration sensor output waveform detection program 63 relates to the acceleration sensor output signal generator 29 in FIG. 16 and FIG. 17, and the operation is described in the flow chart in FIG. 23.

When the indoor/outdoor determination program 601 is executed in step ST11 in FIG. 21, the acceleration sensor output waveform detection program 63 in FIG. 20 is selected. The power generation detection program then executes in step ST200 in FIG. 23. This tries to determine if the GPS wristwatch 100 is indoors or outdoors based on the amplitude of the output wave from the acceleration sensor 125.

More specifically, if the GPS wristwatch 100 is outdoors, the amplitude of the output wave of the acceleration sensor 125 rises to a certain level. Conversely, if the GPS wristwatch 100 is indoors, the amplitude of the output wave decreases. The indoor/outdoor determination is thus based in this case on the amplitude of the output wave. Alternatively, frequency analysis of the output signal from the acceleration sensor output signal generator 29 can be used together with the amplitude to base on the indoor/outdoor determination on whether a particular wave cycle is detected. A periodic wave is acquired as the result of the frequency analysis if the GPS wristwatch 100 is determined to be outdoors, and a periodic wave is not acquired and signal output is random if the GPS wristwatch 100 is indoors.

Figure 25:
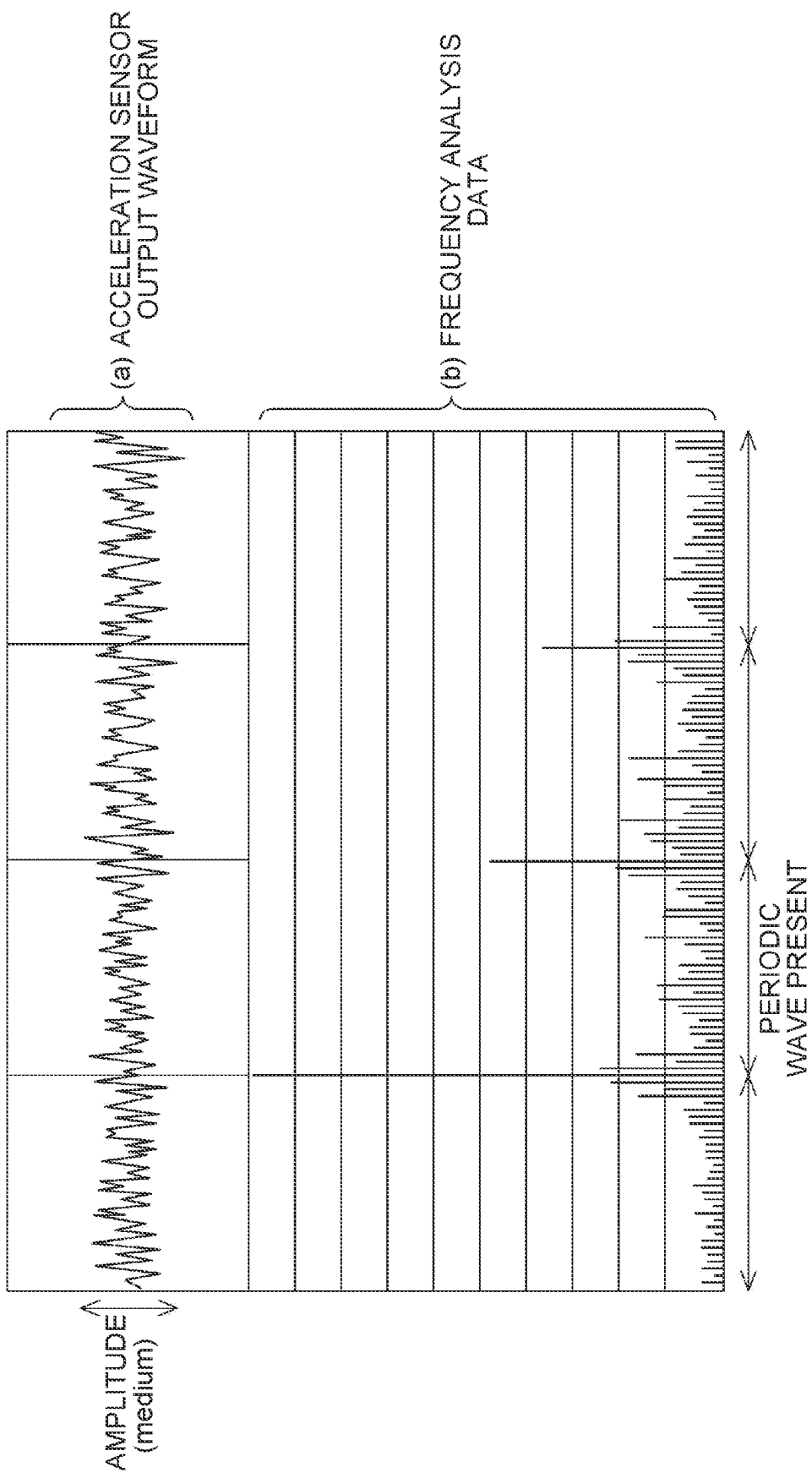
FIG. 25 is a graph showing (a) the acceleration sensor output wave of the acceleration sensor output signal generator in FIG. 16 that has the acceleration sensor shown in FIG. 15 and the (b) frequency analysis data when walking outdoors.
Figure 26:
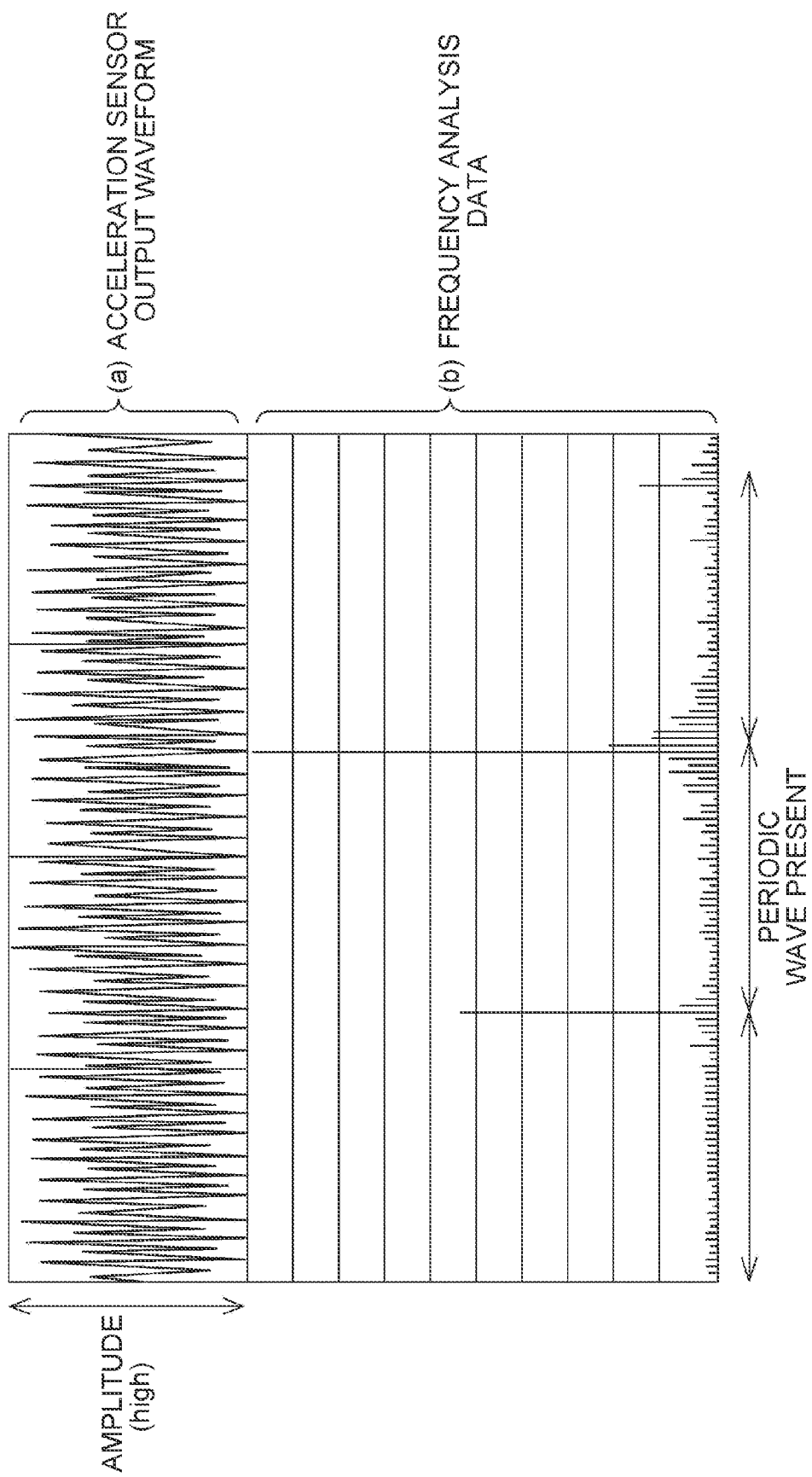
FIG. 26 is a graph showing (a) the acceleration sensor output wave of the acceleration sensor output signal generator in FIG. 16 that has the acceleration sensor shown in FIG. 15 and the (b) frequency analysis data when running outdoors.
Figure 27:
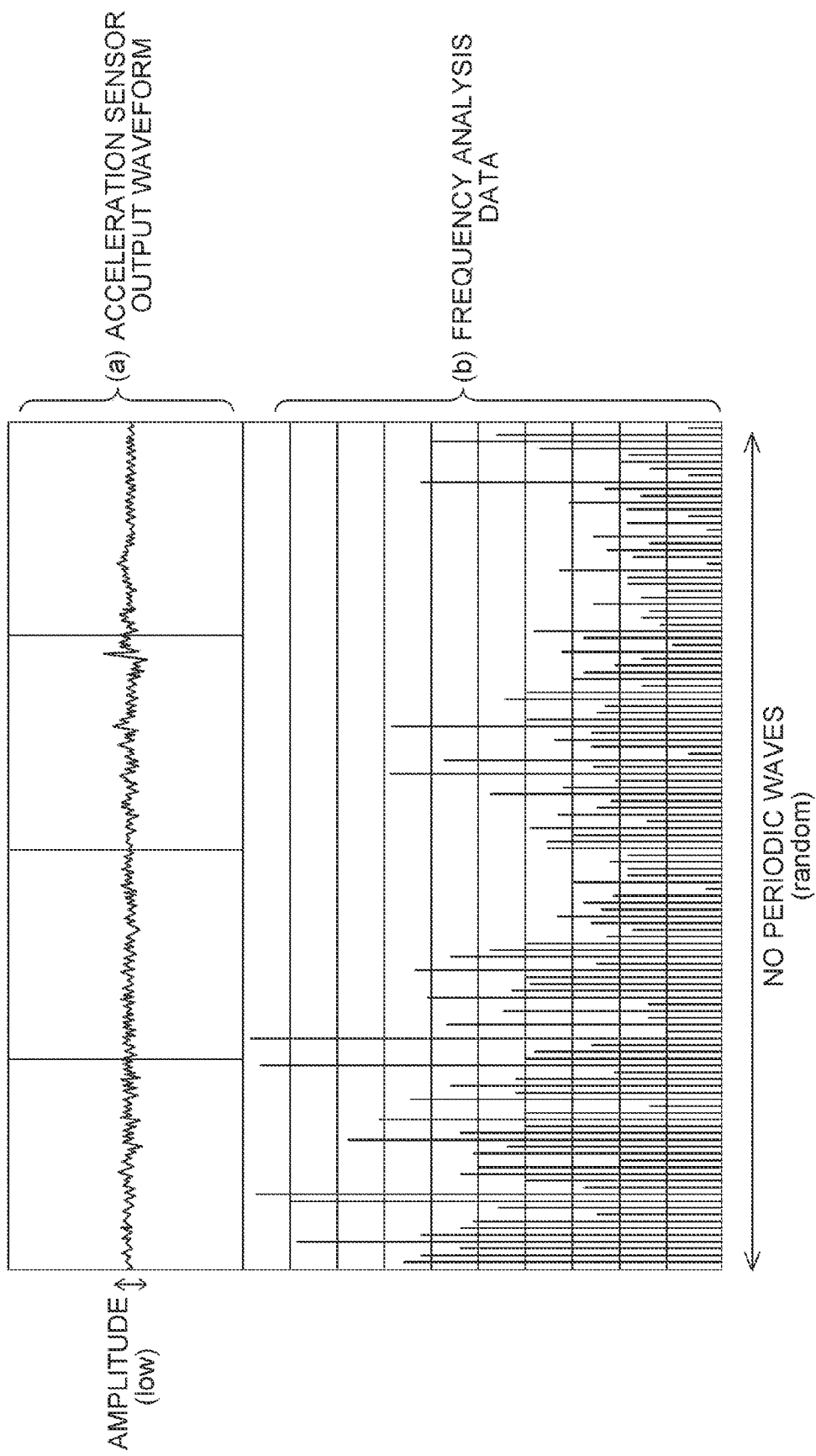
FIG. 27 is a graph showing (a) the acceleration sensor output wave of the acceleration sensor output signal generator in FIG. 16 that has the acceleration sensor shown in FIG. 15 and the (b) frequency analysis data when walking indoors.

FIG. 25 to FIG. 27 are graphs showing (a) the acceleration sensor output wave of the acceleration sensor output signal generator 29 having the acceleration sensor 125, and the (b) frequency analysis data. FIG. 25 and FIG. 26 show the results when outdoors, FIG. 25 shows the results when walking outdoors, and FIG. 26 shows the results when running outdoors. FIG. 27 shows the results from indoor activity. As will be known by comparing the amplitude of the acceleration sensor output waves in FIG. 25 and FIG. 26 with the amplitude of the acceleration sensor output wave in FIG. 27, the amplitude is higher in FIG. 25 and FIG. 26. Comparing walking outdoors in FIG. 25 and indoor activity in FIG. 27 shows that the amplitude in FIG. 25 is approximately three times greater. Comparing the frequency analysis data shows that a periodic wave results when outdoors as shown in FIG. 25 and FIG. 26, but a periodic wave is not acquired when indoors as shown in FIG. 27. The amplitude of the output wave from the acceleration sensor is therefore referenced to the amplitude that results when walking outdoors as shown in FIG. 25, and the GPS wristwatch 100 is determined to be indoors if the amplitude of the output wave from the acceleration sensor output signal generator 29 is less than this reference amplitude and outdoors if greater than the reference amplitude. More specifically, this aspect of the invention uses the amplitude when walking outdoors as shown in FIG. 25 as the reference amplitude.

The amplitude when walking outdoors as shown in FIG. 25 is therefore set to a value of 1, for example, in this aspect of the invention and stored as the acceleration sensor output signal amplitude threshold value data 441 in the acceleration threshold value data storage unit 144. If the amplitude of the output wave from the acceleration sensor output signal generator 29 is greater than or equal to 1, the GPS wristwatch 100 is then determined to be in an outdoor environment, and the GPS wristwatch 100 is determined to be in an indoor environment if the amplitude is less than 1.

More specifically, when the acceleration sensor output waveform detection program 63 executes in step ST200, the acceleration sensor output wave and/or frequency analysis data from the acceleration sensor output signal generator 29 having the acceleration sensor 125 is acquired in step ST201. The acceleration sensor output waveform detection program 63 stores this acquired data in the acceleration sensor detection data storage unit 154 in FIG. 19.

Next in step ST202 the acceleration sensor output waveform detection program 63 gets the amplitude data 57*a* and/or period data 57*b* from the acceleration sensor output waveform 154*a* and/or frequency analysis data 154*b* stored in the acceleration sensor detection data storage unit 154, and stores the acquired data in the generated waveform amplitude data storage unit 57 in FIG. 19.

In step ST203 the acceleration sensor output waveform detection program 63 compares the amplitude data 57*a* stored in the generated waveform amplitude data storage unit 57 with the reference amplitude data (1, for example) when walking outdoors shown in FIG. 25, that is, with the acceleration sensor output signal amplitude threshold value data 441 in the acceleration threshold value data storage unit 144 in FIG. 18.

In step ST204 the acceleration sensor output waveform detection program 63 determines if the amplitude data is greater than or equal to the acceleration sensor output signal amplitude threshold value data 441 and/or whether periodic frequency data was detected. If the amplitude is greater than or equal to the acceleration sensor output signal amplitude threshold value data 441 and/or frequency period data 57*b* was detected, control goes to step ST209 and the output time of the acceleration sensor output signal generator 29 having the acceleration sensor 125 is measured. In step ST211 the acceleration sensor output waveform detection program 63 determines if the continuous output time is greater than or equal to a prescribed time, that is, whether output continues for one minute or longer, for example. If output continues for one minute or longer in this example, control goes to step ST212 where it is determined that a GPS satellite can be captured and the acceleration sensor output waveform detection program 63 then ends. More particularly, the GPS wristwatch 100 is determined to be outdoors, the acceleration sensor output waveform detection program 63 ends, control advances to step ST12 in FIG. 21 which determines the program ended normally and thus passes control to step ST15. The GPS satellite scan then begins and four or more GPS satellites are captured. The position of the GPS wristwatch 100 is then determined by steps ST16 to ST20, and the time is adjusted.

Determining whether output continues for one minute or more in step ST211 is repeated a specific number of times N, such as until N=5. If outdoors but the acceleration sensor output does not continue for approximately one minute, the user may be waiting for a signal or movement may be stopped, and measuring signal output therefore repeats approximately five times. If output continues for less than one minute until N=5 or more, control goes to step ST207 and the time measurement timer is stopped. The timer is then reset in step ST208, and the acceleration sensor output waveform detection program 63 executed as the indoor/outdoor determination program 601 is aborted.

Control then returns to step ST12 in FIG. 21. Because the program did not terminate normally in this case, control goes to step ST13, a message telling the user that a GPS satellite cannot be captured is displayed, a prompt telling the user to manually adjust the time is displayed in step ST14 as described above, and operation ends.

Referring again to step ST204, if the amplitude value is less than the acceleration sensor output signal amplitude threshold value data 441 and/or frequency period data 57*b* is not detected, a time measurement timer is started in step ST205 to measure how long the amplitude is less than the acceleration sensor output signal amplitude threshold value data 441 and/or frequency period data 57*b* is not detected. Step ST206 then determines if the time that the amplitude is less than the acceleration sensor output signal amplitude threshold value data 441 and/or frequency period data 57*b* is not detected continues for a prescribed period of time, such as one week. If the time that the amplitude is less than the acceleration sensor output signal amplitude threshold value data 441 and/or frequency period data 57*b* is not detected continues for the prescribed period of one week or more, control goes to step ST207 and the time measurement timer is stopped. The timer is then reset in step ST208, and the program is aborted.

Control then returns to step ST12 in FIG. 21. Because the program did not terminate normally in this case, control goes to step ST13, a message telling the user that a GPS satellite cannot be captured is displayed, a prompt telling the user to manually adjust the time is displayed in step ST14 as described above, and operation ends.

The GPS wristwatch 100 in this aspect of the invention is thus arranged to determine with good precision whether the GPS wristwatch 100 is indoors or outdoors.

The acceleration sensor output waveform detection program 63 is thus an example of an indoor/outdoor determination unit that acquires amplitude data 57*a* and/or frequency period data 57*b*, which are information about the environment of the reception unit (GPS receiver 19), and evaluates the reception environment (whether indoors or outdoors) of the reception unit (GPS receiver 19) based on this amplitude data 57*a* and/or frequency period data 57*b*.

Furthermore, by storing the time band when the acceleration sensor output waveform detection program 63 executes and determines that the amplitude data 57*a* is greater than or equal to the acceleration sensor output signal amplitude threshold value data 441 and/or frequency period data 57*b* is detected, and the time band when the amplitude data 57*a* is less the acceleration sensor output signal amplitude threshold value data 441 and/or frequency period data 57*b* is not detected, in the indoor/outdoor determination information storage unit 58 in FIG. 19, the time band in which the positioning information satellite can be captured can be determined from the information in the indoor/outdoor determination information storage unit 58. This is convenient for the user because it is not always necessary to determine when a positioning information satellite can be captured by detecting movement with the acceleration sensor.

As described above, the GPS wristwatch 100 according to this aspect of the invention determines if the reception environment is indoors or outdoors, based on this determination selects, captures, and receives signals from a suitable GPS satellite 15$a$ by referencing the almanac data to determine its position and adjust the time, and can thus adjust the time with high precision and low power consumption. This aspect of the invention is thus particularly effective in electronic devices such as timepieces that require a very small power supply and the ability to set the time with high precision.

Daylight Table Extraction Program 62 and Power Generation/Acceleration Selection Program 64

Operation when the daylight table extraction program 62 and the power generation/acceleration selection program 64 are additionally selected as the indoor/outdoor determination program 601 is described next.

The daylight table extraction program 62 and the power generation/acceleration selection program 64 select whether to run the power generation detection program 61 or the acceleration sensor output waveform detection program 63 in relation to daylight time, and complement the operation of the power generation detection program 61 and the acceleration sensor output waveform detection program 63. Operation is described in the flow chart in FIG. 24.

The operation of the power generation detection program 61 and the acceleration sensor output waveform detection program 63 is as described above. Further description repeating the above description is thereof is thus omitted below where the differences are described in detail.

Figure 24:
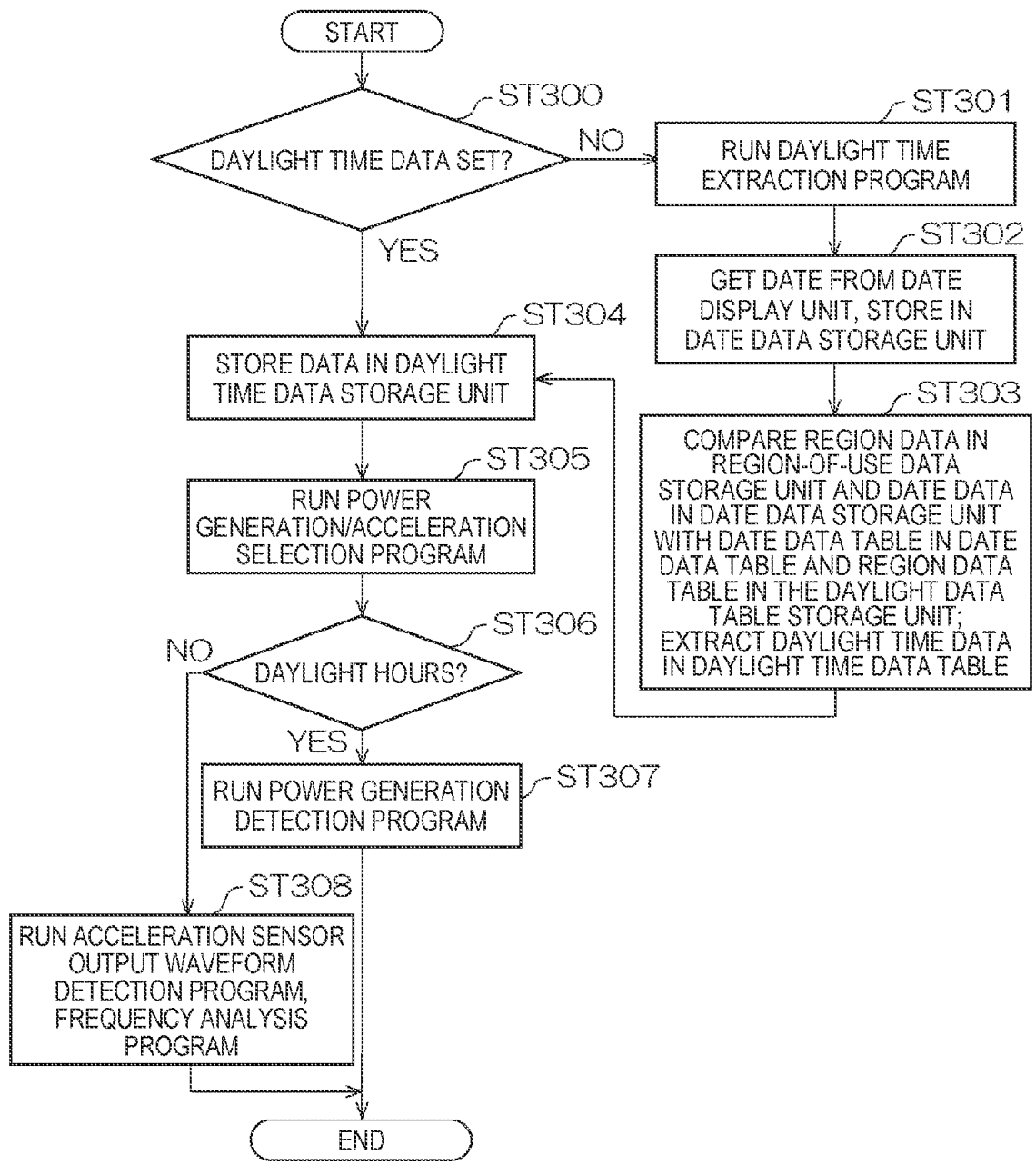
FIG. 24 is a flow chart of the program for selecting the power generation detection program or the acceleration detection program as the indoor/outdoor determination unit in FIG. 21.

When the indoor/outdoor determination program 601 executes in step ST11 in FIG. 21, control goes to step ST300 in FIG. 24. In step ST300 the indoor/outdoor determination program 601 determines if daylight data has already been set by the user. If daylight time data is set, control goes to step ST304 and the indoor/outdoor determination program 601 stores the daylight time data in the daylight time data storage unit 153 in FIG. 19. Control then goes to step ST305, and operation from step ST305 is described further below. Operation when the daylight data has not already been set is described next.

If step ST300 determines that the daylight time data has not been set, control goes to step ST301 to run the daylight table extraction program 62 in FIG. 20. In step ST302 the daylight table extraction program 62 then gets the date data from the date display unit 122 (FIG. 17) of the timepiece device 18 shown in FIG. 16, and stores the date data in the date data storage unit 151 in FIG. 19. Then in step ST303 the daylight table extraction program 62 uses the region-of-use data 56$a$ stored in the region-of-use data storage unit 56 and the date data 151$a$ in the date data storage unit 151 in FIG. 19 for comparison with the data in the region data table 411 and the date data table 413 stored in the daylight data table storage unit 141 in FIG. 18, and selects the corresponding data.

The daylight data table storage unit 141 stores the region data table 411, the date data table 413, and the daylight time data table 412 in a matrix so that when two values are decided in the data tables, the value from the remaining data table can be extracted.

Therefore, because the region-of-use data 56$a$ and the date data 151$a$ acquired from the date display unit 122 of the timepiece device 18 are known and the values in the corresponding data tables can thus be determined, the remaining unknown daylight time data can be extracted from the daylight time data table 412. The daylight time data table 412 contains region values, date data, and the corresponding sunset and sunrise times.

The region-of-use data 56$a$ stored in the region-of-use data storage unit 56 can be preset by the user. The region-of-use can also be determined and stored based on the result of determining the device position when GPS satellite signals were previously received.

Control then goes to step ST304 and the extracted daylight time data is stored in the daylight time data storage unit 153 in FIG. 19. Control then goes to step ST305 and the power generation/acceleration selection program 64 in FIG. 20 executes.

The power generation/acceleration selection program 64 selects whether to execute the power generation detection program 61 or the acceleration sensor output waveform detection program 63 based on certain conditions, and makes the selection appropriately according to the conditions of the GPS wristwatch 100.

More specifically, the power generation detection program 61 determines whether the GPS wristwatch 100 is indoors or outdoors based on the power output of the solar panel charging device 21, which is a solar cell, and using the power generation detection program 61 as the main means of determining if the GPS wristwatch 100 is indoors or outdoors may not be preferable under certain conditions, such as during the night. It is therefore necessary to select the program that is currently suitable to run as the indoor/outdoor determination program 601.

The power generation/acceleration selection program 64 is therefore executed in step ST305. In step ST306 the power generation/acceleration selection program 64 compares the daylight time data 153$a$ stored in the daylight time data storage unit 153 with the time data 59$a$ acquired from the time display unit 28 of the timepiece device 18 of the GPS wristwatch 100.

If the environment of the GPS wristwatch 100 is during daylight hours (daytime), control goes to step ST307 and the power generation detection program 61 executes.

If it is not during daylight hours (nighttime), however, control goes to step ST308 and the acceleration sensor output waveform detection program 63 executes.

Operation of the power generation detection program 61 and the acceleration sensor output waveform detection program 63 is as described above and further description thereof is thus omitted here. This time data 59$a$ is the data acquired from the time display unit 28 and written to the time data storage unit 59 in FIG. 19, and reflects any correction later made when the time is adjusted.

When the power generation detection program 61 or the acceleration sensor output waveform detection program 63 terminates normally, control goes to step ST15 in FIG. 21. If the program did not terminate normally, control goes to step ST13, the programs are aborted, a message telling the user that a GPS satellite cannot be captured is displayed, a prompt telling the user to manually adjust the time is displayed in step ST14 as described above, and operation ends.

Because whether to execute the power generation detection program 61 or execute the acceleration sensor output waveform detection program 63 can thus be suitably and smoothly selected, the reception unit (GPS receiver 19) can be prevented from starting the reception operation even though reception is not possible and thus increasing power consumption.

The daylight time data that is used for the determination made by the power generation/acceleration selection program 64, and the time band when the reception unit (GPS receiver 19) was activated because of an outdoor determination based on the indoor/outdoor determination standard of the power generation detection program 61 or acceleration sensor output waveform detection program 63, are stored in the indoor/outdoor determination information storage unit 58. The data stored in the indoor/outdoor determination information storage unit 58 can then be used the next time the daylight time determination and the indoor/outdoor determination are made in order to start the reception operation of the reception unit (GPS receiver 19). This also makes the indoor/outdoor determination standard known, whether to execute the power generation detection program 61 or the acceleration sensor output waveform detection program 63 can therefore be easily selected, the decision time required to start reception is shortened, and power consumption can be further reduced.

The power output used by the power generation detection program 61 and the power generation/acceleration selection program 64 relates to the solar panel charging device 21 in the foregoing embodiments of the invention, but the invention is not so limited. A temperature sensor, for example, can be used instead. More specifically, power output can be determined based on a temperature difference detected by a temperature sensor, for example.

Though not shown in the figures, a temperature sensor can be disposed on the side where the back cover 131 of the GPS wristwatch 100 touches the wrist, for example, and on the side where the GPS wristwatch 100 is exposed to air, such as the crystal 16 or the front of the case 132. The temperature difference between these sensor can then be detected to determine how much power is generated.

More specifically, this type of power generation uses a Peltier device, which is a flat semiconductor device that uses the Peltier effect of heat moving from one metal conductor to the other metal conductor when current passes through a junction using two different types of metal conductors. The ends of the two metal conductors rendering the Peltier device are arranged so that one end is on the side that contacts the wrist, for example, and the other end is on the side exposed to air to detect the temperature.

Current flows according to the detected temperature difference. The generated power can then be detected to determine if the device is indoors or outdoors.

The indoor/outdoor determination can be made using this temperature sensor regardless of whether it is day or night. Furthermore, while one thermocouple pair produces approximately 0.4 mV, power can be generated even when there is only a slight temperature difference, such as a temperature difference of 3° C. or more, if the temperature sensor uses multiple thermocouples, and detection precision can therefore be improved.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. An electronic device comprising:
a reception unit that captures a positioning information satellite orbiting the Earth and receives a signal from the positioning information satellite; and a corrected time information display unit that generates time correction information based on the satellite signal received by the reception unit, corrects the displayed time information based on the time correction information, and displays the corrected time;

wherein the reception unit includes an indoor/outdoor determination unit that comprises:
 a solar panel;
 a power generation detection data storage unit that detects power generation by the solar panel, and acquires and stores power generation detection data, and
 a power generation threshold value data storage unit that stores power generation threshold value data related to a power generation threshold value used by the reception unit for the indoor/outdoor determination;
 wherein the indoor/outdoor determination unit determines the environment of the electronic device based on the power generation detection data in the power generation detection data storage unit and the power generation threshold value data in the power generation threshold value data storage unit of the indoor/outdoor determination unit; and wherein the reception unit captures the positioning information satellite based on the indoor/outdoor determination unit.

2. The electronic device described in claim 1, wherein:
the indoor/outdoor determination unit comprises an acceleration sensor;
 an acceleration sensor detection data storage unit that detects the output waveform of the acceleration sensor and stores the resulting acceleration sensor output waveform data;
 a generated waveform amplitude data storage unit that generates and stores amplitude data from the acceleration sensor output waveform data; and
 an acceleration threshold value data storage unit that stores acceleration sensor output signal amplitude threshold value data related to a threshold value of the amplitude data used by the reception unit for the indoor/outdoor determination; and
the indoor/outdoor determination unit determines the environment of the electronic device further based on the amplitude data from the acceleration sensor of the indoor/outdoor determination unit, and the acceleration sensor output signal amplitude threshold value data in the acceleration threshold value data storage unit.

3. The electronic device described in claim 2, wherein:
the indoor/outdoor determination unit comprises a date data storage unit that stores date data for a date display unit of the electronic device;
 a time data storage unit that stores time data for a time display unit of the electronic device;
 a region-of-use data storage unit for inputting region-of-use information for the location of the reception unit; and
 a daylight data table storage unit that stores data tables including a region data table, a date data table, and a daylight time data table;
the electronic device further comprising:
a daylight time extraction data storage unit that extracts and stores daylight time data from the daylight time data table based on the date data and region-of-use information, and the region data table and date data table in the daylight data table storage unit; and a power generation/acceleration selection unit that compares the daylight time data with the time data in the time data storage unit.

4. The electronic device described in claim 3, wherein the region-of-use information is the position of the reception unit determined from the satellite signal received from the positioning information satellite.

5. The electronic device described in claim 4, wherein:
the indoor/outdoor determination unit comprises an indoor/outdoor determination information storage unit that stores a time band when the reception unit captured the positioning information satellite; and
the reception unit captures the positioning information satellite further based on the time band in the indoor/outdoor determination information storage unit.

6. The electronic device described in claim 1, wherein:
the indoor/outdoor determination unit further comprises a temperature sensor; and
the power generation detection data storage unit detects power generation from the temperature sensor.

7. A time correction method for a timepiece device, comprising:
a step of a reception unit that receives satellite signals from positioning information satellites orbiting the Earth capturing the positioning information satellite;
a time correction information generating step of a time correction unit generating time correction information based on the satellite signals received by the reception unit; and
a displayed time information correcting step of a display information correction unit correcting the displayed time information based on the time correction information;
wherein the reception unit has an indoor/outdoor determination unit for determining the environment of the timepiece device in the step of capturing the positioning information satellite;
the indoor/outdoor determination unit has a power generation detection process including
detecting and storing power generation by a solar panel, and
comparing the power generation detection data and power generation threshold value data in a power generation threshold value data storage unit that stores power generation threshold value data related to a power generation threshold value used to determine if the reception unit is indoors or outdoors; and
the reception unit is an electronic device that captures the positioning information satellite based on the indoor/outdoor determination unit.

8. A time correction method for a timepiece device, comprising:
a step of a reception unit that receives satellite signals from positioning information satellites orbiting the Earth capturing the positioning information satellite;
a time correction information generating step of a time correction unit generating time correction information based on the satellite signals received by the reception unit; and
a displayed time information correcting step of a display information correction unit correcting the displayed time information based on the time correction information;
wherein the reception unit has an indoor/outdoor determination unit for determining the environment of the timepiece device in the step of capturing the positioning information satellite;
the indoor/outdoor determination unit has an acceleration sensor output waveform detection process including
detecting and storing output waveform data from the acceleration sensor,
generating and storing amplitude data from the output waveform data, and
comparing the amplitude data with acceleration sensor output signal amplitude threshold value data related to a threshold value of the amplitude data used to determine if the reception unit is indoors or outdoors; and
the reception unit is an electronic device that captures the positioning information satellite based on the indoor/outdoor determination unit.

9. A time correction method for a timepiece device, comprising:
a step of a reception unit that receives satellite signals from positioning information satellites orbiting the Earth capturing the positioning information satellite;
a time correction information generating step of a time correction unit generating time correction information based on the satellite signals received by the reception unit; and
a displayed time information correcting step of a display information correction unit correcting the displayed time information based on the time correction information;
wherein the reception unit has an indoor/outdoor determination unit for determining the environment of the timepiece device in the step of capturing the positioning information satellite;
the indoor/outdoor determination unit has a power generation detection process including
detecting and storing power generation by a solar panel, and
comparing the power generation detection data and power generation threshold value data in a power generation threshold value data storage unit that stores power generation threshold value data related to a power generation threshold value used to determine if the reception unit is indoors or outdoors; and
an acceleration sensor output waveform detection process including
detecting and storing output waveform data from the acceleration sensor,
generating and storing amplitude data from the output waveform data, and
comparing the amplitude data with acceleration sensor output signal amplitude threshold value data related to the amplitude data used to determine if the reception unit is indoors or outdoors; and
the reception unit is an electronic device that captures the positioning information satellite based on the indoor/outdoor determination unit.

* * * * *